United States Patent
Thao et al.

(10) Patent No.: US 12,177,300 B2
(45) Date of Patent: Dec. 24, 2024

(54) METHODS AND COMPUTING SYSTEMS FOR VEHICLE CONNECTION VISIBILITY

(71) Applicant: Mercedes-Benz Group AG, Stuttgart (DE)

(72) Inventors: Armao Thao, Escondido, CA (US); Ravikant Kolli, Bothell, WA (US); Christopher Barkley, Seattle, WA (US); Aakanksha Sharma, Seattle, WA (US)

(73) Assignee: Mercedes-Benz Group AG, Stuttgart (DE)

( * ) Notice: Subject to any disclaimer, the term of this patent is extended or adjusted under 35 U.S.C. 154(b) by 115 days.

(21) Appl. No.: 18/190,383

(22) Filed: Mar. 27, 2023

(65) Prior Publication Data

US 2024/0333795 A1     Oct. 3, 2024

(51) Int. Cl.
| | | |
|---|---|---|
| G06F 15/16 | (2006.01) | |
| G06F 9/54 | (2006.01) | |
| G06F 16/953 | (2019.01) | |
| H04L 43/0811 | (2022.01) | |
| H04L 67/12 | (2022.01) | |
| H04L 67/14 | (2022.01) | |
| H04L 67/54 | (2022.01) | |

(52) U.S. Cl.
CPC ............. *H04L 67/12* (2013.01); *G06F 9/547* (2013.01); *G06F 16/953* (2019.01); *H04L 43/0811* (2013.01); *H04L 67/14* (2013.01); *H04L 67/54* (2022.05)

(58) Field of Classification Search
CPC ..... H04L 67/12; H04L 67/54; H04L 43/0811; H04L 67/14; G06F 16/953; G06F 9/547
See application file for complete search history.

(56) References Cited

U.S. PATENT DOCUMENTS 9,716,762 B2      7/2017  Petersen et al.
2021/0264383 A1*  8/2021  Kleinhans .............. G07C 5/008

OTHER PUBLICATIONS

International Search Report with Written Opinion of the International Search Authority for the Application No. PCT/EP2024/053371 mailed Apr. 30, 2024.

* cited by examiner

*Primary Examiner* — Normin Abedin
(74) *Attorney, Agent, or Firm* — Dority & Manning, P.A.

(57) ABSTRACT

A control circuit may obtain, over a network, a first communication from a first vehicle by a first channel, the first channel associated with a first communication protocol; generate ongoing session data associated with the first communication, the ongoing session data defining a first online session between the computing system and the first vehicle over the first channel; determine, by the control circuit, a network event associated with the first vehicle from the first online session associated with the first communication protocol, wherein the network event is associated with an event timestamp; in response to determining the network event, generate first session record data associated with the first online session, the first session record data comprising the event timestamp and identifying the first channel; and output, for storage in a memory, the first session record data in a session history dataset associated with the first vehicle.

20 Claims, 9 Drawing Sheets

METHODS AND COMPUTING SYSTEMS FOR VEHICLE CONNECTION VISIBILITY

FIELD

The present disclosure relates generally to methods and systems for generating aggregated communication session history across multiple channels to determine vehicle connection visibility.

BACKGROUND

A vehicle may communicate with a backend system through one or more communication protocols, such as Short Messaging Service (SMS), HyperText Transfer Protocol (HTTP), Message Queue Telemetry Transport (MQTT), etc. The backend system may provide various functionality for the vehicle, such as navigation services, support services, and fleet analytics services. Keeping records of vehicle communications across the multiple communication channels can be challenging, especially across a fleet of multiple vehicles.

SUMMARY

Aspects and advantages of embodiments of the present disclosure will be set forth in part in the following description, or may be learned from the description, or may be learned through practice of the embodiments.

One example aspect of the present disclosure is directed to a computing system. The computing system may include a control circuit of a first vehicle. The control circuit may be configured to obtain, over a network, a first communication from a first vehicle by a first channel, the first channel associated with a first communication protocol. The control circuit may be configured to generate ongoing session data associated with the first communication, the ongoing session data defining a first online session between the computing system and the first vehicle over the first channel. The control circuit may be configured to determine, by the control circuit, a network event associated with the first vehicle from the first online session associated with the first communication protocol, wherein the network event is associated with an event timestamp. The control circuit may be configured to, in response to determining the network event, generate first session record data associated with the first online session, the first session record data comprising the event timestamp and identifying the first channel. The control circuit may be configured to output, for storage in a memory, the first session record data in a session history dataset associated with the first vehicle. The session history dataset associated with the first vehicle comprises at least second session record data for a second online session between the computing system and the first vehicle over a second channel that is different from the first channel, the second channel associated with a second communication protocol that is different from the first communication protocol.

In an embodiment, the session history dataset associated with the first vehicle is stored in a session history database comprising at least one or more second session history datasets associated with a fleet of vehicles comprising the first vehicle and the control circuit is further configured to compute aggregate data for the first vehicle based on the session history dataset and the at least one or more second session history datasets associated with the fleet of vehicles comprising the first vehicle.

In an embodiment, the control circuit is further configured to: obtain a request via an online status API of the session history database, the request comprising a vehicle identifier associated with the first vehicle; based on the vehicle identifier, access the session history dataset associated with the first vehicle; determine most recent session record data associated with the first vehicle irrespective of channel; determine an online status of the first vehicle based on an event timestamp of the most recent session record data associated with the first vehicle; and provide the online status of the first vehicle via the online status API.

In an embodiment, determining most recent session record data associated with the first vehicle irrespective of channel comprises: accessing most recent session record data associated with each of a plurality of channels for communication between the computing system and the first vehicle, the plurality of channels including the first channel and the second channel; and determining the most recent session record data associated with the first vehicle based on a comparison of event timestamps of the most recent session record data associated with each of the plurality of channels.

In an embodiment, the control circuit is further configured to: obtain a request via a vehicle history API, the request comprising one or more search criteria, the one or more search criteria comprising at least a vehicle identifier; based on the vehicle identifier, access the session history dataset associated with the first vehicle; generate a response based on the one or more search criteria, the response comprising returned session record data of the session history dataset, the returned session record data satisfying the one or more search criteria; and provide the response via the vehicle history API.

In an embodiment, computing the aggregate data comprises at least one of: determining a quantity of online vehicles of the fleet of vehicles associated with one or more analytic criteria; determining a quantitative ranking of online vehicles of the fleet of vehicles associated with the one or more analytic criteria; generating a traffic ranking of online vehicles of the fleet of vehicles based on a geographic region; or determining a connectivity event in a region serviced by the fleet of vehicles based on the session history dataset.

In an embodiment, the first communication protocol or the second communication protocol comprise one or more of: an HTTP protocol; an SMS protocol; or an MQTT protocol.

In an embodiment, the network event comprises a disconnect event indicating that the first vehicle has disconnected from the first online session.

In an embodiment, determining the network event comprises: subsequent to obtaining the first communication, initiating a disconnect countdown associated with the first online session; resetting the disconnect countdown in response to receiving a subsequent communication from the first vehicle; determining that the disconnect countdown has expired; and, in response to determining that the disconnect countdown has expired, determining the event timestamp based on a timestamp associated with a most recent communication from the first vehicle.

In an embodiment, determining the network event comprises determining that the first vehicle has initiated a new online session with the computing system over the first channel and determining the event timestamp based on a timestamp associated with a most recent communication of the first online session.

In an embodiment, the control circuit is further configured to: determine, based on the session history dataset, an expected operating characteristic of the first vehicle, the expected operating characteristic comprising at least one of an expected operating duration, an expected communication channel, or an expected operating time; determine, based on the expected operating characteristic, a predicted backend session for providing a backend service to the first vehicle; and provide the backend service to the first vehicle based on the predicted backend session.

In an embodiment, obtaining the first communication from the first vehicle comprises: receiving the first communication from the first vehicle at a first service in communication with the first vehicle through the first communication protocol; and providing the first communication from the first service to a vehicle visibility service configured to generate the ongoing session data based on the first communication.

In an embodiment, the control circuit is further configured to, prior to obtaining the first communication from the first vehicle, receive a confirmation message from an operator of the first vehicle, the confirmation message authorizing the control circuit to obtain the first communication from the first vehicle.

In an embodiment, the first session record data comprises an initial timestamp associated with the first communication.

In an embodiment, the session history dataset associated with the first vehicle comprises third session record data for a third online session between the computing system and the first vehicle over the first channel using the first communication protocol; and one or more of the first online session, the second online session, or the third online session are associated with a respective disconnect event indicating that the first vehicle has disconnected from the one or more of the first online session, the second online session, or the third online session.

Another example aspect of the present disclosure is directed to a computer-implemented method. The computer-implemented method may include obtaining, over a network, a first communication from a first vehicle by a first channel, the first channel associated with a first communication protocol. The computer-implemented method may include generating ongoing session data associated with the first communication, the ongoing session data defining a first online session between the computing system and the first vehicle over the first channel. The computer-implemented method may include determining a network event by the first vehicle from the first online session associated with the first communication protocol, wherein the network event is associated with an event timestamp. The computer-implemented method may include, in response to determining the disconnection, generating first session record data associated with the first online session, the first session record data comprising the event timestamp and identifying the first channel. The computer-implemented method may include outputting, for storage in a memory, the first session record data in a session history dataset associated with the first vehicle, wherein the session history dataset associated with the first vehicle comprises at least second session record data for a second online session between the computing system and the first vehicle over a second channel that is different from the first channel, the second channel associated with a second communication protocol that is different from the first communication protocol. The computer-implemented method may include computing aggregate data for the first vehicle based on the session history dataset and at least one or more second session history datasets associated with a fleet of vehicles comprising the first vehicle.

In an embodiment, the computer-implemented method further comprises obtaining a request via an online status API of the session history database, the request comprising a vehicle identifier associated with the first vehicle; based on the vehicle identifier, accessing the session history dataset associated with the first vehicle; determining most recent session record data associated with the first vehicle irrespective of channel; determining an online status of the first vehicle based on an event timestamp of the most recent session record data associated with the first vehicle; and providing the online status of the first vehicle via the online status API.

In an embodiment, the computer-implemented method further comprises obtaining a request via a vehicle history API, the request comprising one or more search criteria, the one or more search criteria comprising at least a vehicle identifier and one or more of a channel identifier, a timeframe, or a geographic region; based on the vehicle identifier, accessing the session history dataset associated with the first vehicle; generating a response based on the one or more search criteria; the response comprising session record data of the session history dataset that conform to the one or more search criteria; and providing the response via the vehicle history API.

In an embodiment, the computer-implemented method further comprises determining, based on the session history dataset, an expected operating characteristic of the first vehicle, the expected operating characteristic comprising at least one of an expected operating duration, an expected communication channel, or an expected operating time; determining, based on the expected operating characteristic, a predicted backend session for providing a backend service to the first vehicle; and providing the backend service to the first vehicle based on the predicted backend session.

Another example aspect of the present disclosure is directed to one or more non-transitory computer-readable media that store instructions that are executable by a control circuit.

The instructions, when executed, may cause the control circuit to obtain, over a network, a first communication from a first vehicle by a first channel, the first channel associated with a first communication protocol. The instructions, when executed, may cause the control circuit to generate ongoing session data associated with the first communication, the ongoing session data defining a first online session between the computing system and the first vehicle over the first channel. The instructions, when executed, may cause the control circuit to determine, by the control circuit, a network event associated with the first vehicle from the first online session associated with the first communication protocol, wherein the network event is associated with an event timestamp. The instructions, when executed, may cause the control circuit to, in response to determining the disconnection, generate first session record data associated with the first online session, the first session record data comprising the event timestamp and identifying the first channel. The instructions, when executed, may cause the control circuit to output, for storage in a memory, the first session record data in a session history dataset associated with the first vehicle. The session history dataset associated with the first vehicle comprises at least second session record data for a second online session between the computing system and the first vehicle over a second channel that is different from the first channel, the second channel associated with a second communication protocol that is different from the first communication protocol.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments hereof and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Overview

Figure 1:
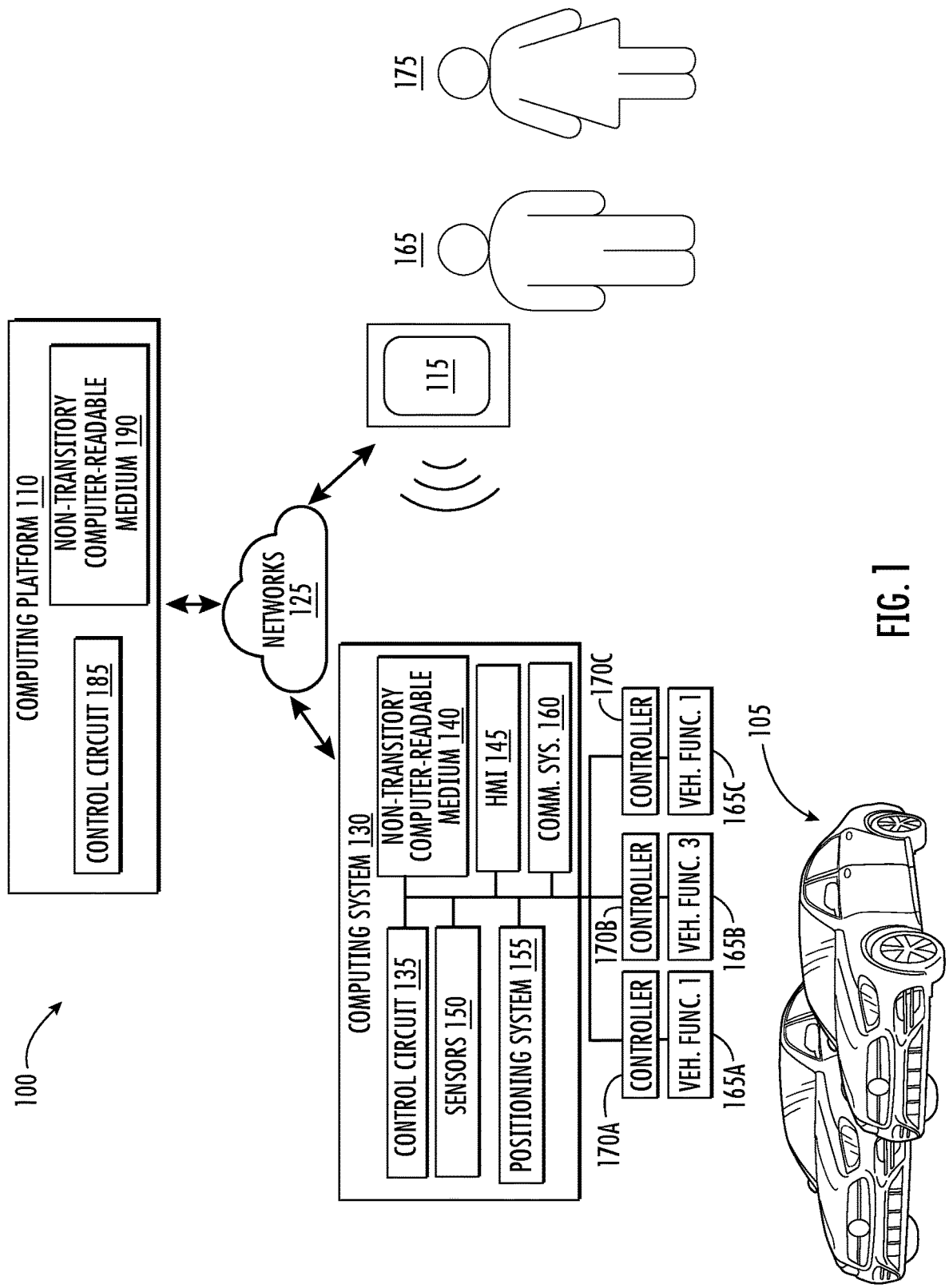
FIG. 1 depicts a diagram of an example computing ecosystem according to example embodiments hereof.

One aspect of the present disclosure relates to methods and computing systems for vehicle connection visibility. In particular, systems and methods according to example aspects of the present disclosure may gather session history across multiple channels facilitating communications between a vehicle and a backend system. For instance, systems and methods according to example aspects of the present disclosure can analyze network session data to create session record data describing histories of network sessions between the vehicle and backend systems. Each of the channels may have a unique communication protocol. The systems and methods according to example aspects of the present disclosure may aggregate the session history for multiple channels such that a user may query the backend system to easily determine whether a given vehicle is accessible or online and/or to perform fleet analytics. This may allow the user to make an informed decision as to vehicle service tasks, such as whether the vehicle is currently in service, whether there are any connectivity events affecting a region, etc.

Aspects of the present disclosure may be beneficial for managing a fleet of vehicles, such as autonomous vehicles, semiautonomous vehicles, and/or vehicles with augmented user experience. For instance, aspects of the present disclosure may be useful for determining whether a vehicle is reachable through various communication protocols to perform service or maintenance, to provide backend services, or otherwise interfacing with the vehicle remotely. Additionally or alternatively, aspects of the present disclosure may improve fleet analytics for a fleet of vehicles to determine connectivity events over regions serviced by the fleet of vehicles.

In particular, a vehicle may connect to a backend system through multiple channels, such as an HTTP channel, SMS channel, and/or MQTT channel. Upon receiving a message from the vehicle, a vehicle visibility service of the backend system may generate ongoing session data associated with the current communication session between the vehicle and the backend system. When the vehicle visibility service detects a network event (e.g., a timeout, disconnect, interrupted session, duplicate session, etc.) indicating that the current session has ended, the service may generate and store session record data recording the communication session relative to the vehicle. Although the session record data may, in some cases, store identifiers indicating which channels were used, the session record data may be stored relative to vehicle rather than relative to channel. A vehicle status API may be accessed to query the session record data and determine when the vehicle last accessed the backend system, regardless of which channel the vehicle used to access the system.

In some implementations, in order to obtain the benefits of the techniques described herein, the user (e.g., a vehicle operator) may be required to allow the collection and analysis of connectivity data and other data from the vehicle. For example, in some implementations, users may be provided with an opportunity to control whether programs or features collect such data. If the user does not allow collection and use of such data, then the user may not receive the benefits of the techniques described herein. The user may also be provided with tools to revoke or modify consent. In addition, certain information or data may be treated in one or more ways before it is stored or used, so that user information is protected. As another example, a computing device may perform most or all data processing on the device (e.g., and not on remote computing devices) such that personally-identifiable data is not transmitted to or recorded by other computing devices. Additionally and/or alternatively, systems and methods according to the present disclosure may act in a privacy-preserving manner such that applications on a computing device do not receive additional data (e.g., audio signals, semantic entities (e.g., unless requested by the application), video data, etc.) as a consequence of operation of the systems and methods. For example, an application may only receive data if a user expressly approves to share the data with the application. In some embodiments, the data may be filtered such that only data belonging to the consenting user of the vehicle is utilized.

Example aspects of the present disclosure provide a number of technical effects and benefits. As one example, the present disclosure facilitates improvements to computing technology by improving the functionality of vehicle connection visibility. For instance, aspects of the present disclosure may reduce computing resource usage associated with querying an online status of a vehicle and/or performing fleet analytics related to connectivity across a plurality of vehicles in a fleet. Additionally or alternatively, aspects of the present disclosure may improve a user experience associated with providing backend services to a vehicle. For instance, aspects of the present disclosure may determine predicted backend sessions based on expected operating characteristics that predict when a vehicle is likely to request backend sessions. Providing backend services relative to predicted backend sessions may reduce the likelihood that a user will be disrupted by the backend services. As one example, if the backend service is an over-the-air update to vehicle firmware or software, the backend service may be scheduled during a time when the update is unlikely to affect the user's ability to use the vehicle. As another example, example aspects of the present disclosure may help system administrators identify (and/or remove) history associated with out-of-service vehicles, therefore reducing computing resource usage associated with out-of-service vehicles and improving overall fleet communication performance and associated updating efficiencies.

Example Systems

With reference now to the figures, example embodiments hereof will be discussed in further detail. It should be noted that the examples provided herein that describe certain functions being performed by certain systems are provided for illustrative purposes only and are not meant to be limiting. For example, operations described as being performed by a lead vehicle (or follower vehicle) may be performed in another computing system (e.g., a cloud based platform system), or vice versa.

FIG. 1 illustrates an example computing ecosystem 100 according to an embodiment hereof. The ecosystem 100 may include a vehicle 105, a remote computing platform 110 (also referred to herein as computing platform 110), and a user device 115 associated with a user 165. The user 165 may be a driver of the vehicle. In an embodiment, the user 165 may be a passenger of the vehicle. The vehicle 105, the computing platform 110, and the user device 115 may be configured to communicate with one another via one or more networks 125.

The systems/devices of ecosystem 100 may communicate using one or more application programming interfaces (APIs). This may include external facing APIs to communicate data from one system/device to another. The external facing APIs may allow the systems/devices to establish secure communication channels via secure access channels over the networks 125 through any number of methods, such as web-based forms, programmatic access via RESTful APIs, Simple Object Access Protocol (SOAP), remote procedure call (RPC), scripting access, etc.

The computing platform 110 may include a computing system that is remote from the vehicle 105. In an embodiment, the computing platform 110 may include a cloud-based server system. The computing platform 110 may include one or more backend services for supporting the vehicle 105. The services may include, for example, tele-assist services, navigation/routing services, performance monitoring services, etc. The computing platform 110 may host or otherwise include one or more APIs for communicating data to/from a computing system 130 of the vehicle 105, the user device 115, and/or other suitable computing systems.

The computing platform 110 may include one or more computing devices. For instance, the computing platform 110 may include a control circuit 185 and a non-transitory computer-readable medium 190 (e.g., memory). The control circuit 185 of the computing platform 110 may be configured to perform the various operations and functions described herein.

In an embodiment, the control circuit 185 may include one or more processors (e.g., microprocessors), one or more processing cores, a programmable logic circuit (PLC) or a programmable logic/gate array (PLA/PGA), a field programmable gate array (FPGA), an application specific integrated circuit (ASIC), or any other control circuit.

In an embodiment, the control circuit 185 may be programmed by one or more computer-readable or computer-executable instructions stored on the non-transitory computer-readable medium 190.

In an embodiment, the non-transitory computer-readable medium 190 may be a memory device, also referred to as a data storage device, which may include an electronic storage device, a magnetic storage device, an optical storage device, an electromagnetic storage device, a semiconductor storage device, or any suitable combination thereof. The non-transitory computer-readable medium 190 may form, e.g., a hard disk drive (HDD), a solid state drive (SDD) or solid state integrated memory, a random access memory (RAM), a read-only memory (ROM), an erasable programmable read-only memory (EPROM or Flash memory), a static random access memory (SRAM), dynamic random access memory (DRAM), a portable compact disc read-only memory (CD-ROM), a digital versatile disk (DVD), or a memory stick. In some cases, the non-transitory computer-readable medium 190 may store computer-executable instructions or computer-readable instructions, such as instructions to perform the operations and methods described herein.

In various embodiments, the terms "computer-readable instructions" and "computer-executable instructions" are used to describe software instructions or computer code configured to carry out various tasks and operations. In various embodiments, if the computer-readable or computer-executable instructions form modules, the term "module" refers broadly to a collection of software instructions or code configured to cause the control circuit 185 to perform one or more functional tasks. The modules and computer-readable/executable instructions may be described as performing various operations or tasks when a control circuit or other hardware component is executing the modules or computer-readable instructions.

The user device 115 may be, or otherwise include, a computing device owned or otherwise accessible to the user 165. For instance, the user device 115 may be or otherwise include a phone, laptop, tablet, wearable device (e.g., smart watch, smart glasses, headphones), personal digital assistant, gaming system, personal desktop devices, other handheld devices, or other types of mobile or non-mobile user devices. As further described herein, the user device 115 may include one or more input components such as buttons, a touch screen, a joystick or other cursor control, a stylus, a microphone, a camera or other imaging device, a motion sensor, etc. The user device 115 may include one or more output components such as a display device (e.g., display screen), a speaker, etc. In an embodiment, the user device 115 may include a component such as, for example, a touchscreen, configured to perform input and output functionality to receive user input and present information for the user 165. The user device 115 may execute one or more instructions to run an instance of a software application and present user interfaces associated therewith. The launch of a software application for a respective transportation platform may initiate a user-network session with the computing platform 110.

The networks 125 may be any type of network or combination of networks that allows for communication between devices. In an embodiment, the networks 125 may include one or more of a local area network, wide area network, the Internet, secure network, cellular network, mesh network, peer-to-peer communication link or some combination thereof and may include any number of wired or wireless links. Communication over the networks 125 may be accomplished, for instance, via a network interface using any type of protocol, protection scheme, encoding, format, packaging, etc. Communication between the computing system 130 of the vehicle 105 and the user device 115 may be facilitated by near field or short range communication techniques (e.g., Bluetooth low energy protocol, radio frequency signaling, NFC protocol).

The vehicle 105 may be a vehicle that is operable by the user 165. In an embodiment, the vehicle 105 may be an automobile or another type of ground-based vehicle that is manually driven by the user 165. For example, the vehicle 105 may be a Mercedes-Benz® car or van. In an embodiment, the vehicle 105 may be an aerial vehicle (e.g., a personal airplane) or a water-based vehicle (e.g., a boat). The vehicle 105 may include operator-assistance functionality such as cruise control, advanced driver assistance systems, etc. In an embodiment, the vehicle 105 may be a fully or semi-autonomous vehicle.

The vehicle 105 may include a power train and one or more power sources. The power train may include a motor, e-motor, transmission, driveshaft, axles, differential, e-components, gear, etc. The power sources may include one or more types of power sources. For example, the vehicle 105 may be a fully electric vehicle (EV) that is capable of operating a power train of the vehicle 105 (e.g., for propulsion) and the vehicle's onboard functions using electric batteries. In an embodiment, the vehicle 105 may use combustible fuel. In an embodiment, the vehicle 105 may include hybrid power sources such as, for example, a combination of combustible fuel and electricity.

The vehicle 105 may include a vehicle interior. The vehicle interior may include the area inside of the body of the vehicle 105 including, for example, a cabin for users of the vehicle 105. The interior of the vehicle 105 may include seats for the users, a steering mechanism, accelerator interface, braking interface, etc. The interior of the vehicle 105 may include a display device such as a display screen associated with an infotainment system. Such a component may be referred to as a display device of the infotainment system or be considered as a device for implementing an embodiment that includes the use of an infotainment system. For illustrative and example purposes, such a component may be referred to herein as a head unit display device (e.g., positioned in a front/dashboard area of the vehicle interior), a rear unit display device (e.g., positioned in the back passenger area of the vehicle interior), an infotainment head unit or rear unit, or the like.

The display device may display a variety of content to the user 165 including information about the vehicle 105, prompts for user input, etc. The display device may include a touchscreen through which the user 165 may provide user input to a user interface. The display device may be associated with an audio input device (e.g., microphone) for receiving audio input from the user 165. In an embodiment, the display device may function as a dashboard of the vehicle 105.

The interior of the vehicle 105 may include one or more lighting elements. The lighting elements may be configured to emit light at various colors, brightness levels, etc.

The vehicle 105 may include a vehicle exterior. The vehicle exterior may include the outer surface of the vehicle 105. The vehicle exterior may include one or more lighting elements (e.g., headlights, brake lights, accent lights). The vehicle 105 may include one or more doors for accessing the vehicle interior by, for example, manipulating a door handle of the vehicle exterior. The vehicle 105 may include one or more windows, including a windshield, door windows, passenger windows, rear windows, sunroof, etc.

Certain routine and conventional components of vehicle 105 (e.g., an engine) are not illustrated or discussed herein for the purpose of brevity. One of ordinary skill in the art will understand the operation of conventional vehicle components in vehicle 105.

The vehicle 105 may include a computing system 130 that is onboard the vehicle 105. The computing system 130 may be located onboard the vehicle 105 in that it is included on or within the vehicle 105. The computing system 130 may include one or more computing devices, which may include various computing hardware components. For instance, the computing system 130 may include a control circuit 135 and a non-transitory computer-readable medium 140 (e.g., memory). The control circuit 135 may be configured to perform the various operations and functions for implementing the technology described herein.

In an embodiment, the control circuit 135 may include one or more processors (e.g., microprocessors), one or more processing cores, a programmable logic circuit (PLC) or a programmable logic/gate array (PLA/PGA), a field programmable gate array (FPGA), an application specific integrated circuit (ASIC), or any other control circuit. In an embodiment, the control circuit 135 or computing system 130 may be part of, or may form, a vehicle control unit (also referred to as a vehicle controller) that is embedded or otherwise disposed in the vehicle 105 (e.g., a Mercedes-Benz® car or van). For example, the vehicle controller may be or may include an infotainment system controller (e.g., an infotainment head-unit), a telematics control unit (TCU), an electronic control unit (ECU), a central powertrain controller (CPC), a charging controller, a central exterior and interior controller (CEIC), a zone controller, or any other controller (the term "or" and "or" may be used interchangeably herein).

In an embodiment, the control circuit 135 may be programmed by one or more computer-readable or computer-executable instructions stored on the non-transitory computer-readable medium 140.

In an embodiment, the non-transitory computer-readable medium 140 may be a memory device, also referred to as a data storage device, which may include an electronic storage device, a magnetic storage device, an optical storage device, an electromagnetic storage device, a semiconductor storage device, or any suitable combination thereof. The non-transitory computer-readable medium 140 may form, e.g., a hard disk drive (HDD), a solid state drive (SDD) or solid state integrated memory, a random access memory (RAM), a read-only memory (ROM), an erasable programmable read-only memory (EPROM or Flash memory), a static random access memory (SRAM), dynamic random access memory (DRAM), a portable compact disc read-only memory (CD-ROM), a digital versatile disk (DVD), or a memory stick. In some cases, the non-transitory computer-readable medium 140 may store computer-executable instructions or computer-readable instructions, such as instructions to perform the methods of FIGS. 5-8. Additionally, or alternatively, similar such instructions may be stored in the computing platform 110 (e.g., the non-transitory computer-readable medium 190) and provided over the networks 125.

The computing system 130 (e.g., the control circuit 135) may be configured to communicate with the other components of the vehicle 105 via a communication channel. The communication channel may include one or more data buses (e.g., controller area network (CAN)), on-board diagnostics connector (e.g., OBD-II), or a combination of wired or wireless communication links. The onboard systems may send or receive data, messages, signals, etc. amongst one another via the communication channel.

In an embodiment, the communication channel may include a direct connection, such as a connection provided via a dedicated wired communication interface, such as a RS-232 interface, a universal serial bus (USB) interface, or via a local computer bus, such as a peripheral component interconnect (PCI) bus. In an embodiment, the communication channel may be provided via a network. The network may be any type or form of network, such as a personal area network (PAN), a local-area network (LAN), e.g., Intranet, a metropolitan area network (MAN), a wide area network (WAN), or the Internet. The network may utilize different techniques and layers or stacks of protocols, including, e.g., a short messaging service (SMS) protocol, a HyperText Transfer Protocol (HTTP), a Message Queue Telemetry Transport (MQTT) protocol, the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol.

In an embodiment, the systems/devices of the vehicle 105 may communicate via an intermediate storage device, or more generally an intermediate non-transitory computer-readable medium. For example, the non-transitory computer-readable medium 140, which may be external to the computing system 130, may act as an external buffer or repository for storing information. In such an example, the computing system 130 may retrieve or otherwise receive the information from the non-transitory computer-readable medium 140.

The vehicle 105 may include one or more human-machine interfaces (HMIs) 145. The human-machine interfaces 145 may include a display device, as described herein. The display device (e.g., touchscreen) may be viewable by a user of the vehicle 105 (e.g., user 165, second user 175) that is located in the front of the vehicle 105 (e.g., driver's seat, front passenger seat). Additionally, or alternatively, a display device (e.g., rear unit) may be viewable by a user that is located in the rear of the vehicle 105 (e.g., back passenger seats).

The vehicle 105 may include one or more sensors 150. The sensors 150 may be configured to acquire sensor data. This may include sensor data associated with the surrounding environment of the vehicle 105, sensor data associated with the interior of the vehicle 105, or sensor data associated with a particular vehicle function including communication and connectivity functions described herein. The sensor data may be indicative of conditions observed in the interior of the vehicle, exterior of the vehicle, or in the surrounding environment. For instance, the sensor data may acquire image data, inside/outside temperature data, weather data, data indicative of a position of a user/object within the vehicle 105, weight data, motion/gesture data, audio data, or other types of data. The sensors 150 may include one or more: cameras (e.g., visible spectrum cameras, infrared cameras), motion sensors, audio sensors (e.g., microphones), weight sensors (e.g., for a vehicle a seat), temperature sensors, humidity sensors, Light Detection and Ranging (LIDAR) systems, Radio Detection and Ranging (RADAR) systems, or other types of sensors. The vehicle 105 may also include other sensors configured to acquire data associated with the vehicle 105. For example, the vehicle 105 may include inertial measurement units, wheel odometry devices, or other sensors.

The vehicle 105 may include a positioning system 155. The positioning system 155 may be configured to generate position data (also referred to as location data) indicative of a position (also referred to as a location) of the vehicle 105. For example, the positioning system 155 may determine position by using one or more of inertial sensors (e.g., inertial measurement units, etc.), a satellite positioning system, based on IP address, by using triangulation or proximity to network access points or other network components (e.g., cellular towers, Wi-Fi access points, etc.), or other suitable techniques. The positioning system 155 may determine a current location of the vehicle 105. The location may be expressed as a set of coordinates (e.g., latitude, longitude), an address, a semantic location (e.g., "at work"), etc.

In an embodiment, the positioning system 155 may be configured to localize the vehicle 105 within its environment. For example, the vehicle 105 may access map data that provides detailed information about the surrounding environment of the vehicle 105. The map data may provide information regarding: the identity and location of different roadways, road segments, buildings, or other items; the location and directions of traffic lanes (e.g., the location and direction of a parking lane, a turning lane, a bicycle lane, or other lanes within a particular roadway); traffic control data (e.g., the location, timing, or instructions of signage (e.g., stop signs, yield signs), traffic lights (e.g., stop lights), or other traffic signals or control devices/markings (e.g., cross walks)); or any other data. The positioning system 155 may localize the vehicle 105 within the environment (e.g., across multiple axes) based on the map data. For example, the positioning system 155 may process sensor data (e.g., LIDAR data, camera data, etc.) to match it to a map of the surrounding environment to get an understanding of the vehicle's position within that environment. The determined position of the vehicle 105 may be used by various systems of the computing system 130 or provided to the computing platform 110.

The vehicle 105 may include a communications system 160 configured to allow the vehicle 105 (and its computing system 130) to communicate with other computing devices. The computing system 130 may use the communications system 160 to communicate with the computing platform 110 or one or more other remote computing devices over a network 125 (e.g., via one or more wireless signal connections). In an embodiment, the communications system 160 may allow communication among one or more of the systems on-board the vehicle 105.

In an embodiment, the communications system 160 may be configured to allow the vehicle 105 to communicate with or otherwise receive data from the user device 115. The communications system 160 may utilize various communication technologies such as, for example, Bluetooth low energy protocol, radio frequency signaling, or other short range or near filed communication technologies. The communications system 160 may include any suitable components for interfacing with one or more networks, including, for example, transmitters, receivers, ports, controllers, antennas, or other suitable components that may help facilitate communication.

The vehicle 105 may include a plurality of vehicle functions 165A-C. A vehicle function 165A-C may be a functionality that the vehicle 105 is configured to perform based on a detected input. The vehicle functions 165A-C may include one or more: (i) vehicle comfort functions; (ii) vehicle staging functions; (iii) vehicle climate functions; (vi) vehicle navigation functions; (v) drive style functions; (v) vehicle parking functions; (vi) vehicle entertainment functions; or (vii) vehicle communication functions.

The vehicle comfort functions may include a window function (e.g., for a door window, sunroof), a seat function, a wall function, a steering wheel function, a pedal function or other comfort functions. In an embodiment, the seat function may include, for example, a seat temperature function that controls the temperature of the seat. This may include a specific temperature (e.g., in degrees C./F) or a temperature level (e.g., low, medium, high). In an embodiment, the seat function may include a seat ventilation function for controlling the ventilation system of a seat. In an embodiment, the seat function may include a seat massage function for controlling the massager devices within a seat. The seat massage function may have one or more levels, each reflective of the intensity of the massage. In an embodiment, the seat massage function may have one or more programs/settings, each reflective of a different type or combination of massage. In an embodiment, the seat function may include a seat position function for controlling a position of a seat in one or more directions, for example forward/backward or up/down. A pedal function may control a position of one or more pedal controls (e.g., a brake pedal, an accelerator pedal) relative to a user's feet. A wall function may control the temperature of the vehicle interior wall or door. A steering wheel function may control a temperature, position, or vibration of the steering wheel.

The vehicle staging functions may control the interior lighting of the vehicle 105. In an embodiment, the vehicle staging functions may include an interior lighting function. For example, the interior lighting function may control the color, brightness, intensity, etc. of the interior lights of the vehicle 105 (e.g., the ambient lighting). In an embodiment, the vehicle staging functions may include one or more predefined lighting programs or combinations. The programs may be set by the user or pre-programed into the default settings of the vehicle 105. In an embodiment, the vehicle staging functions may include an exterior lighting function. For example, the exterior lighting function may control accent lighting under or otherwise located along the exterior of the vehicle 105.

The vehicle climate functions may control the interior climate of the vehicle 105. In an embodiment, the vehicle climate functions may include an air conditioning/heating function for controlling the air conditioning/heating system or other systems associated with setting the temperature within the cabin of the vehicle 105. In an embodiment, the vehicle climate functions may include a defrost or fan function for controlling a level, type, or location of air flow within the cabin of vehicle 105. In an embodiment, the vehicle climate functions may include an air fragrance function for controlling a fragrance within the interior of the vehicle 105.

The vehicle navigation functions may control the vehicle's system for providing a route to a particular destination. For example, the vehicle 105 may include an onboard navigation system that provides a route to the user 165 for travelling to a destination. The navigation system may leverage map data and global positioning system (GPS) based signals to provide guidance to the user 165 via a display device within the interior of the vehicle 105.

The vehicle parking functions may control the vehicle's parking-related features. In an embodiment, the vehicle parking function may include a parking camera function that controls a side, rear, or three-hundred-sixty-degree camera to assist a user 165 when parking the vehicle 105. Additionally, or alternatively, the vehicle parking function may include a parking assistance function that helps to maneuver the vehicle 105 into a parking area.

The vehicle entertainment functions may control one or more entertainment-related features of the vehicle 105. For example, the vehicle entertainment functions may include a music function for controlling a radio or controlling another source of audio or visual media. The vehicle entertainment functions may control sound parameters (e.g., volume, bass, treble, speaker distribution) or select a radio station or media content type/source.

The vehicle communication functions may include or may control various services provided to the vehicle for improved navigation functionality, communications functions, and other suitable functionality facilitated by backend services. As one example, the vehicle communication functions may include communications with a backend navigation service that provides navigation functions (e.g., directions, routing, etc.) to the vehicle 105. As another example, the vehicle communication functions may include communications with a backend weather service that provides weather updates (e.g., temperature, humidity, etc.) to the vehicle 105 based on the vehicle's location. As another example, the vehicle communication functions may include communications with a backend diagnostic service that provides diagnostic functionality to the vehicle 105.

Each vehicle function may include a controller 170A-C associated with that particular vehicle function 165A-C. The controller 170A-C for a particular vehicle function may include control circuitry configured to operate its associated vehicle function 165A-C. For example, a controller may include circuitry configured to turn the seat heating function on, to turn the seat heating function off, set a particular temperature or temperature level, etc.

In an embodiment, a controller 170A-C for a particular vehicle function may include or otherwise be associated with a sensor that captures data indicative of the vehicle function being turned on or off, a setting of the vehicle function, etc. For example, a sensor may be an audio sensor or a motion sensor. The audio sensor may be a microphone configured to capture audio input from the user 165. For example, the user 165 may provide a voice command to activate the radio function of the vehicle 105 and request a particular station. The motion sensor may be a visual sensor (e.g., camera), infrared, RADAR, etc. configured to capture a gesture input from the user 165. For example, the user 165 may provide a hand gesture motion to adjust a temperature function of the vehicle 105 to lower the temperature of the vehicle interior. The sensor may additionally or alternatively be a connectivity sensor configured to detect a quality of communication signal (e.g., cellular, satellite, Wi-Fi, etc.) available to the vehicle 105 at one or more given times. For example, a connectivity sensor can provide a relative communication signal strength or communication signal quality indication on a numerical scale, number of bars, or other quantitative unit of measure.

The controllers 170A-C may be configured to send signals to the control circuit 135 or another onboard system. The signals may encode data associated with a respective vehicle function. The encoded data may indicate, for example, a function setting, timing, etc.

The user 165 may interact with a vehicle function 165A-C through user input. The user input may specify a setting of the vehicle function 165A-C selected by the user (a "user-selected setting"). In an embodiment, a vehicle function 165A-C may be associated with a physical interface such as, for example, a button, a knob, a switch, a lever, a touch screen interface element, or other physical mechanism. The physical interface may be physically manipulated to control the vehicle function 165A-C in accordance with the user-selected setting. By way of example, a user 165 may physically manipulate a button associated with a seat massage function to set the seat massage function to a level five massage intensity. In an embodiment, the user 165 may interact with a vehicle function 165A-C via a user interface element presented on a user interface of a display device (e.g., of an infotainment system in dashboard of the vehicle).

Figure 2:
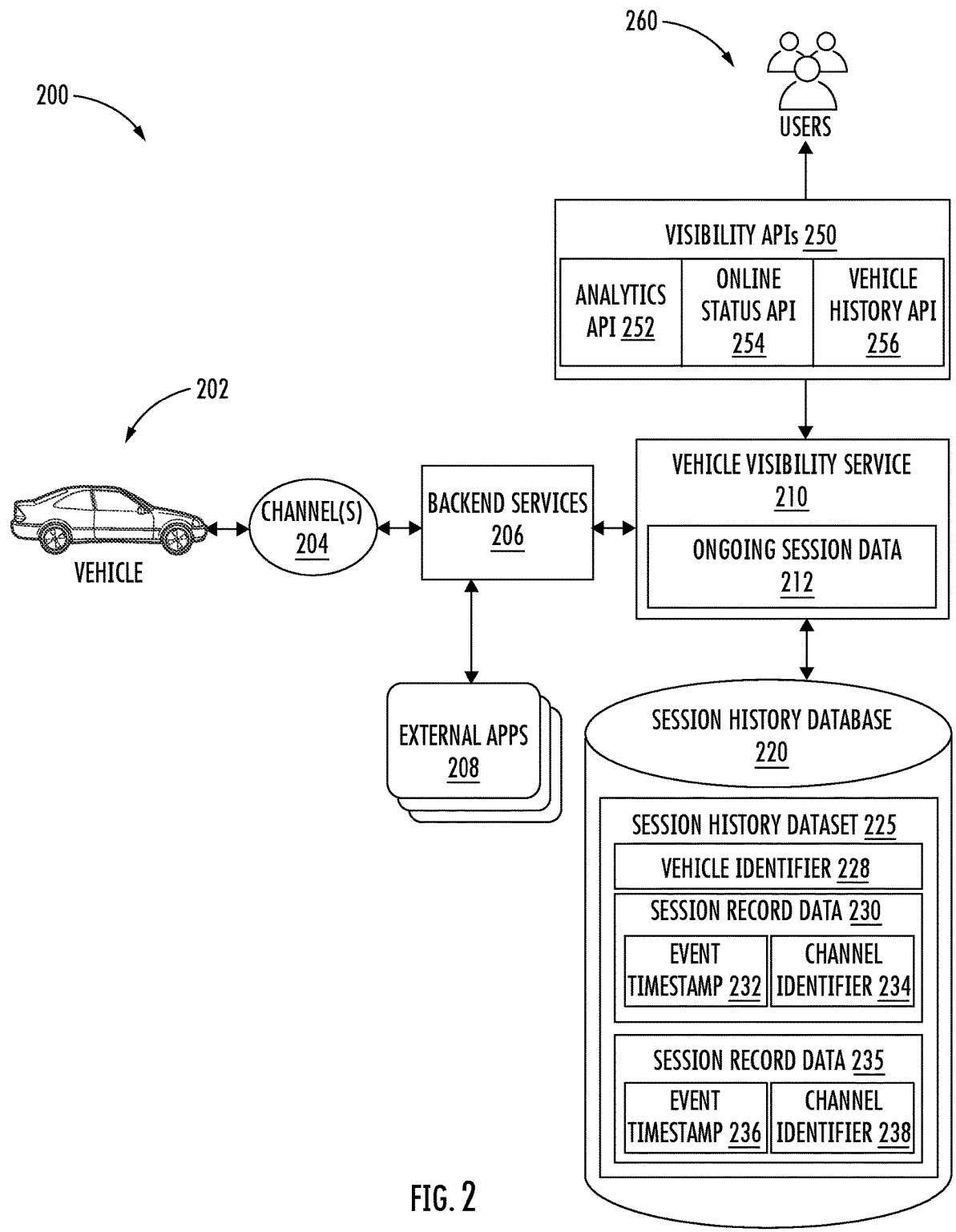
FIG. 2 depicts a diagram of an example computing system architecture according to example embodiments hereof.

FIG. 2 depicts a diagram of an example computing system 200 according to example embodiments hereof. The computing system 200 may facilitate communications between vehicle 202 and the vehicle visibility service 210. The vehicle 202 may be any suitable vehicle, such as the vehicle 105 of FIG. 1. The vehicle 202 may include an on-board computing system, such as the computing system 130 of FIG. 1.

The vehicle 202 may access one or more backend services 206 through one or more channels 204. For instance, the vehicle 202 may access the one or more backend services 206 to improve functionality and/or user experience of the vehicle 202. As examples, the one or more backend services 206 may include tele-assist services, navigation/routing services, performance monitoring services, and/or other suitable services. In particular, in some cases, the one or more backend services 206 may implement functionality from one or more external applications 208. The vehicle 202 may access the one or more backend services 206 over any suitable channel(s) 204. In particular, in some implementations, the vehicle 202 may be capable of communication over a plurality of channels 204. Each of the channels 204 may be associated with a (e.g., unique) communication protocol. The communication protocol may be any suitable communication protocol, such as, for example, an SMS protocol, an HTTP protocol, or an MQTT protocol.

A vehicle visibility service 210 may obtain a communication from the vehicle 202. For instance, in some implementations, the vehicle visibility service 210 may obtain communications from the backend services 206. In some implementations, the vehicle visibility service 210 may actively listen for communications. Additionally or alternatively, the backend services 206 may route communications to the vehicle visibility service 210. The vehicle visibility service 210 may be configured to record ongoing session data 212 associated with current online sessions between the vehicle 202 and the backend services 206. For instance, the ongoing session data 212 may record a start time of the session, a duration of the session, a vehicle identifier associated with the vehicle 202, a channel identifier associated with the channel 204 over which the session occurs, an identifier associated with the backend services 206, and/or other suitable data for defining the online session. In particular, in some implementations, the ongoing session data 212 may be respective to a channel 204 such that if the vehicle 202 is in communication with the computing system over a plurality of channels including the channel 204, the ongoing session data records data associated only with the channel 204 (e.g., and not the other channels of the plurality of channels).

The vehicle visibility service 210 may determine the occurrence of a network event indicating that the vehicle 202 has disconnected from the current online session. The network event may be, for example, a disconnection event, a timeout event, etc. An event timestamp indicating when the network event occurs may be associated with the network event. Upon the occurrence of the network event, the vehicle visibility service 210 may record session record data 230 associated with the current online session (e.g., represented by ongoing session data 212). For instance, the vehicle visibility service 210 may store the ongoing session data 212 as session record data 230 in a session history dataset 225 associated with the vehicle 202. The session history dataset 225 may include a vehicle identifier 228 associated with the vehicle 202 and indicating which vehicle is associated with a given session history dataset 225. The vehicle visibility service 210 may store the event timestamp 232 associated with the network event that prompted storage of session record data 230. Additionally or alternatively, the session record data 230 may include a channel identifier 234 identifying which channel the online session of session record data 230 was communicated over.

Additionally, the session history dataset 225 may include session record data 235 associated with another (e.g., a previous) online session. Similar to the session record data 230, the session record data 235 may include an event timestamp 236 associated with the previous online session and/or a channel identifier 238 associated with the previous online session. In this way, the session history dataset 225 may maintain a record of online sessions associated with the vehicle 202 (e.g., the vehicle identifier 228). The session history dataset 225 may be stored in a session history database 220. The session history database 220 may include session history datasets for the vehicle 202 and/or for a plurality of other vehicles, such as a fleet of vehicles including vehicle 202.

One or more visibility APIs 250 may provide for users 260 to access the vehicle visibility service 210 and/or the session history database 220. In some implementations, the visibility APIs 250 may be REST APIs. The visibility APIs 250 may provide streamlined access to various components of the computing system 200, such as the vehicle visibility service 210 and/or the session history database 220.

For instance, the visibility APIs 250 may include an analytics API 252 that provides for users 260 to perform data analytics on the fleet of vehicles with data in the session history database 220. For instance, a user 260 may query the session history database 220 by the analytics API 252 to compute aggregate data for the fleet of vehicles including the vehicle 202. As one example, in some implementations, computing the aggregate data may include determining a quantity of online vehicles of the fleet of vehicles associated with one or more analytic criteria. As another example, computing the aggregate data may include determining a quantitative ranking of online vehicles of the fleet of vehicles associated with the one or more analytic criteria. As another example, computing the aggregate data may include generating a traffic ranking of online vehicles of the fleet of vehicles based on a geographic region. As another example, computing the aggregate data may include determining a connectivity event in a region serviced by the fleet of vehicles based on the session history dataset.

Additionally or alternatively, the visibility APIs 250 may include an online status API 254. The online status API 254 may provide for a user 260 to query the online status of a given vehicle in the fleet of vehicles with data in the session history database 220. For instance, the online status API 254 may obtain a request including a vehicle identifier, based on the vehicle identifier, access the session history dataset 225 associated with the vehicle identifier (e.g., 228); determine most recent session record data (e.g., 230, 235) associated with the vehicle irrespective of channel; determine an online status of the vehicle (e.g., 202) based on an event timestamp of the most recent session record data associated with the vehicle; and provide the online status of the first vehicle via the online status API 254.

Additionally or alternatively, the visibility APIs 250 may include a vehicle history API 256. The vehicle history API 256 may provide for a user 260 to query a vehicle history of a given vehicle in the fleet of vehicles with data in the session history database 220. For instance, the vehicle history API 256 may obtain a request including one or more search criteria including at least a vehicle identifier, based on the vehicle identifier, access the session history dataset 225 associated with the vehicle (e.g., 202); generate a response based on the one or more search criteria, the response including returned session record data satisfying the one or more search criteria; and provide the response via the vehicle history API 256.

Figure 3:
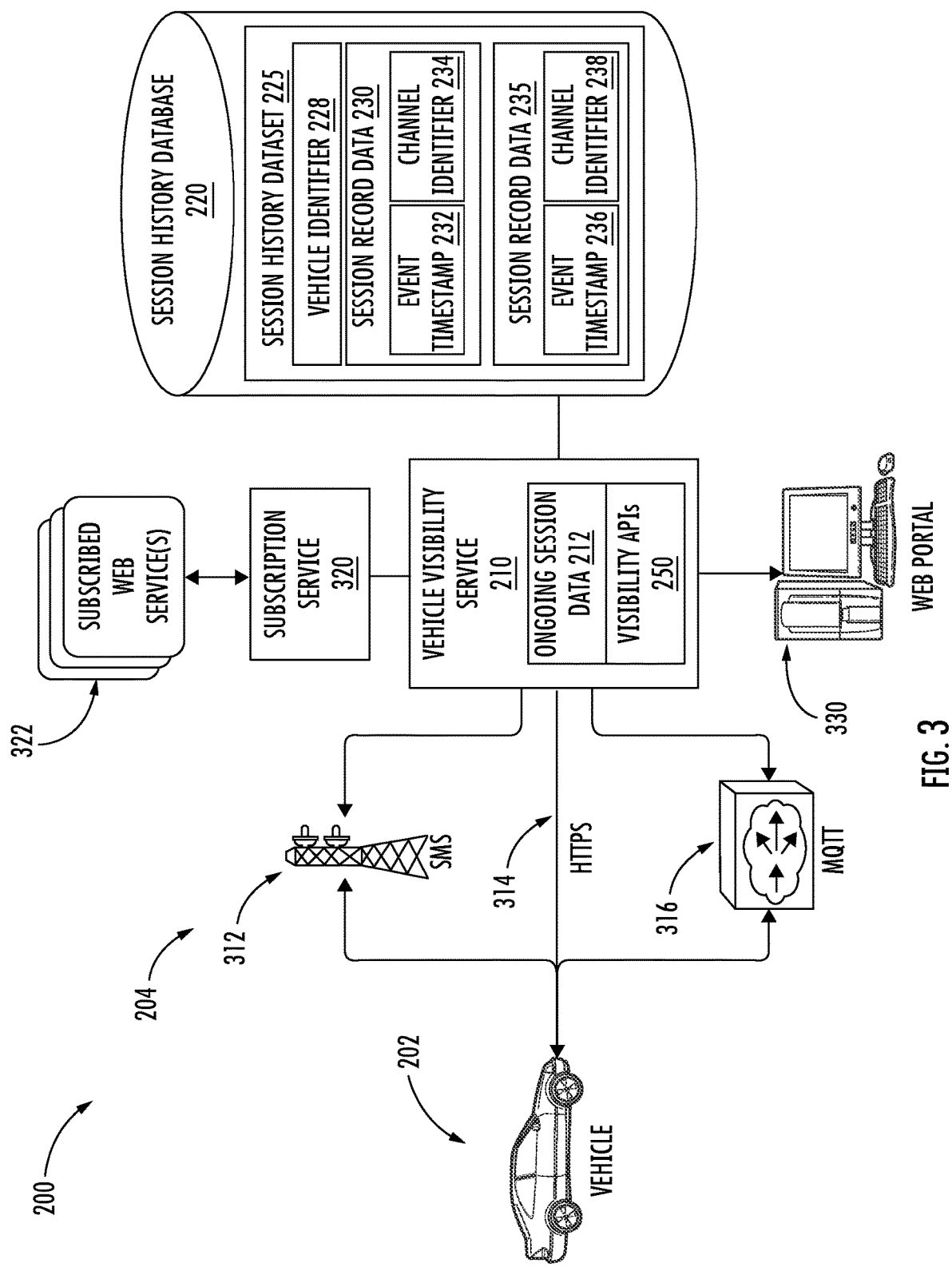
FIG. 3 depicts a diagram of an example computing system architecture according to example embodiments hereof.

FIG. 3 depicts a diagram of an example computing system 300 according to example embodiments hereof. FIG. 3 includes components having similar reference numbers to those discussed with respect to FIG. 2, such as, for example, vehicle 202, session history database 220, etc. It should be understood that similar reference numbers are intended to refer to similar functionality to that discussed with respect to FIG. 2, except where expressly mentioned otherwise.

The computing system 300 includes the channels 204. In particular, the channels 204 may include a Short Messaging Service (SMS) channel 312, a HyperText Transfer Protocol (HTTP or HTTPS) channel 314, and an Message Queue Telemetry Transport (MQTT) channel 316. The SMS channel 312 may communicate messages between the vehicle 202 and vehicle visibility service 210 over a cellular or tower-based network, such as a 2G, 3G, 4G, or 5G cellular network. The HTTP channel 314 may communicate messages between the vehicle 202 and vehicle visibility service 210 over an internet connection (e.g., between a client device at the vehicle 202 and a server hosting the vehicle visibility service 210. The MQTT channel 316 may communicate messages between the vehicle 202 and the vehicle visibility service 210 by a machine-to-machine connection.

Additionally, the computing system 300 may include a web portal 330. The web portal 330 may provide for web-based (e.g., internet-based) access to the vehicle visibility service 210. For instance, the web portal 330 may facilitate interactions between the users 260 (FIG. 2) and the vehicle visibility service 210 (e.g., the visibility APIs 250). Additionally or alternatively, the web portal 330 may provide for users 260 to access other components of the computing system 300 (e.g., the session history database 220).

In some implementations, the vehicle visibility service 210 may provide for other services to subscribe to access data associated with a vehicle's online status (e.g., with consent from operator(s) of the vehicle). For instance, the subscription service 320 may query the vehicle visibility service 210 (e.g., the visibility APIs 250) to learn when a given vehicle (e.g., 202) comes online. The subscription service 320 may provide online status updates of vehicle 202 to the subscribed web services 322 such that the subscribed web services 322 may interface with the vehicle 202 when it is online. As one example, the subscribed web services 322 may include a virtual assistant service that prompts an operator of the vehicle 202 to input a destination for navigation services. As another example, the subscribed web services 322 may include a music playback service. In some implementations, the subscribed web services 322 may include at least some of the external applications 208 of FIG. 2.

Figure 4:
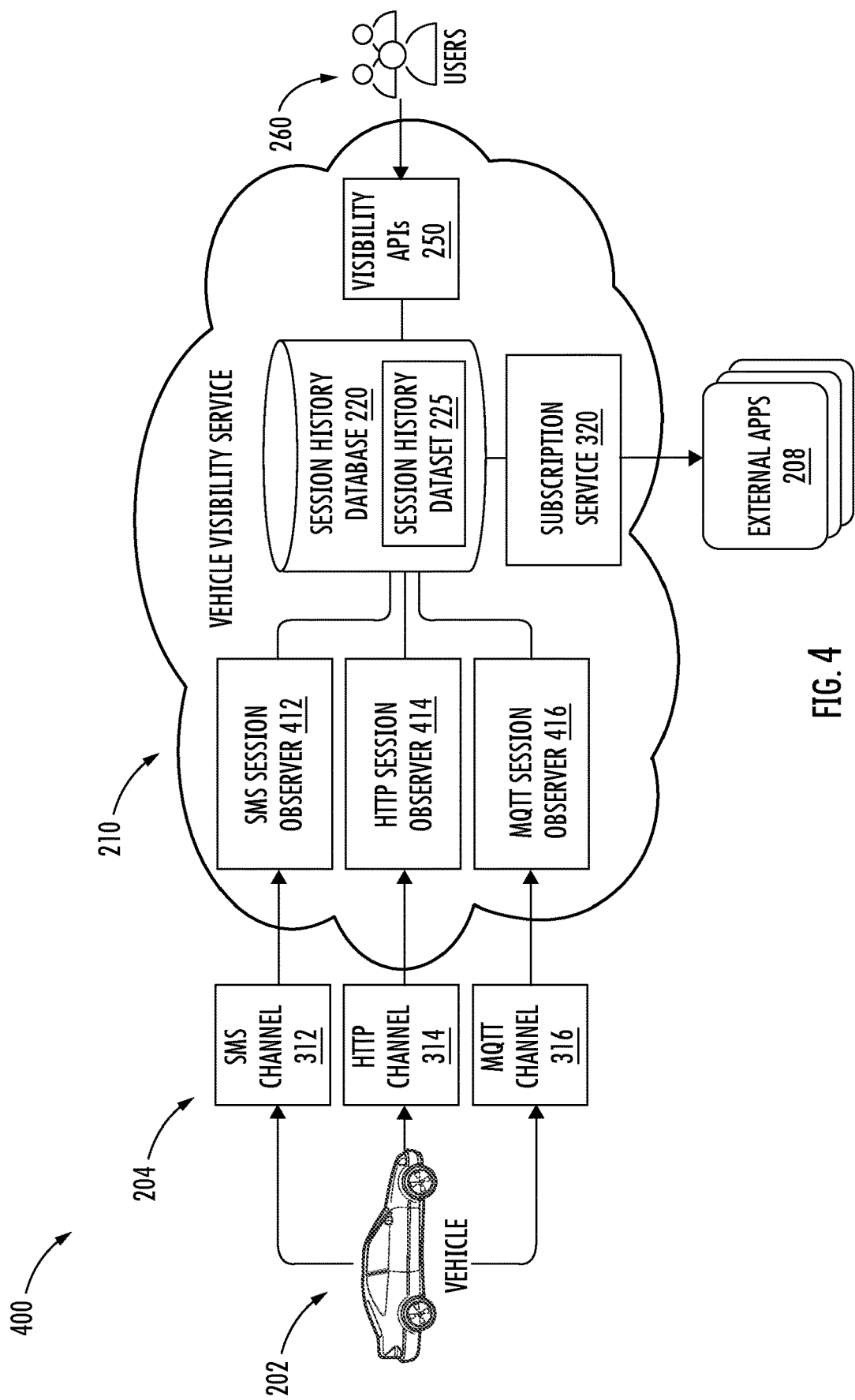
FIG. 4 depicts a diagram of an example vehicle visibility service according to example embodiments hereof.

FIG. 4 depicts a diagram of an example system 400 including the vehicle visibility service 210 according to example embodiments hereof. FIG. 3 includes components having similar reference numbers to those discussed with respect to FIGS. 2 and 3, such as, for example, vehicle 202, session history database 220, etc. It should be understood that similar reference numbers are intended to refer to similar functionality to that discussed with respect to FIGS. 2 and 3, except where expressly mentioned otherwise.

As illustrated in FIG. 4, the vehicle visibility service 210 may include an observer module for each of the channels 204. In particular, the vehicle visibility service 210 may include a SMS session observer 412 configured to observe and record session record data from the SMS channel 312. Additionally or alternatively, the vehicle visibility service 210 may include a HTTP session observer 414 configured to observe and record session record data from the HTTP channel 314. Additionally or alternatively, the vehicle visibility service 210 may include a MQTT session observer 416 configured to observe and record session record data from the MQTT channel 316. In examples with more or fewer channels, more or fewer observer modules may be included in the vehicle visibility service 210.

Each of the session observers 412, 414, 416 may be configured to observe communications over a given channel 204 and extract relevant data from the communications on that channel 204 to establish the ongoing session data 212 and ultimately the session record data 230. For instance, the session observers 412, 414, 416 may observe communications over the channel including a variety of information such as, for example, a device identifier, a network address, a location of the vehicle 202, a timestamp, message contents, and so on. While some of this information may be stored in the ongoing session data 212, other information is not desirably stored. Thus, the session observers 412, 414, 416 can extract the relevant data (e.g., message timestamps) from the communications over the channels 204.

Example Methods for Vehicle Connection Visibility

The following flow diagrams include operations that are executable by computing system(s). Operations described as being performed by a certain computing system in the example described herein are not meant to be limiting and may be performed by another computing system. For example, operations described as being performed onboard a vehicle may be performed by a computing system that is remote from the vehicle, or vice versa.

Figure 5:
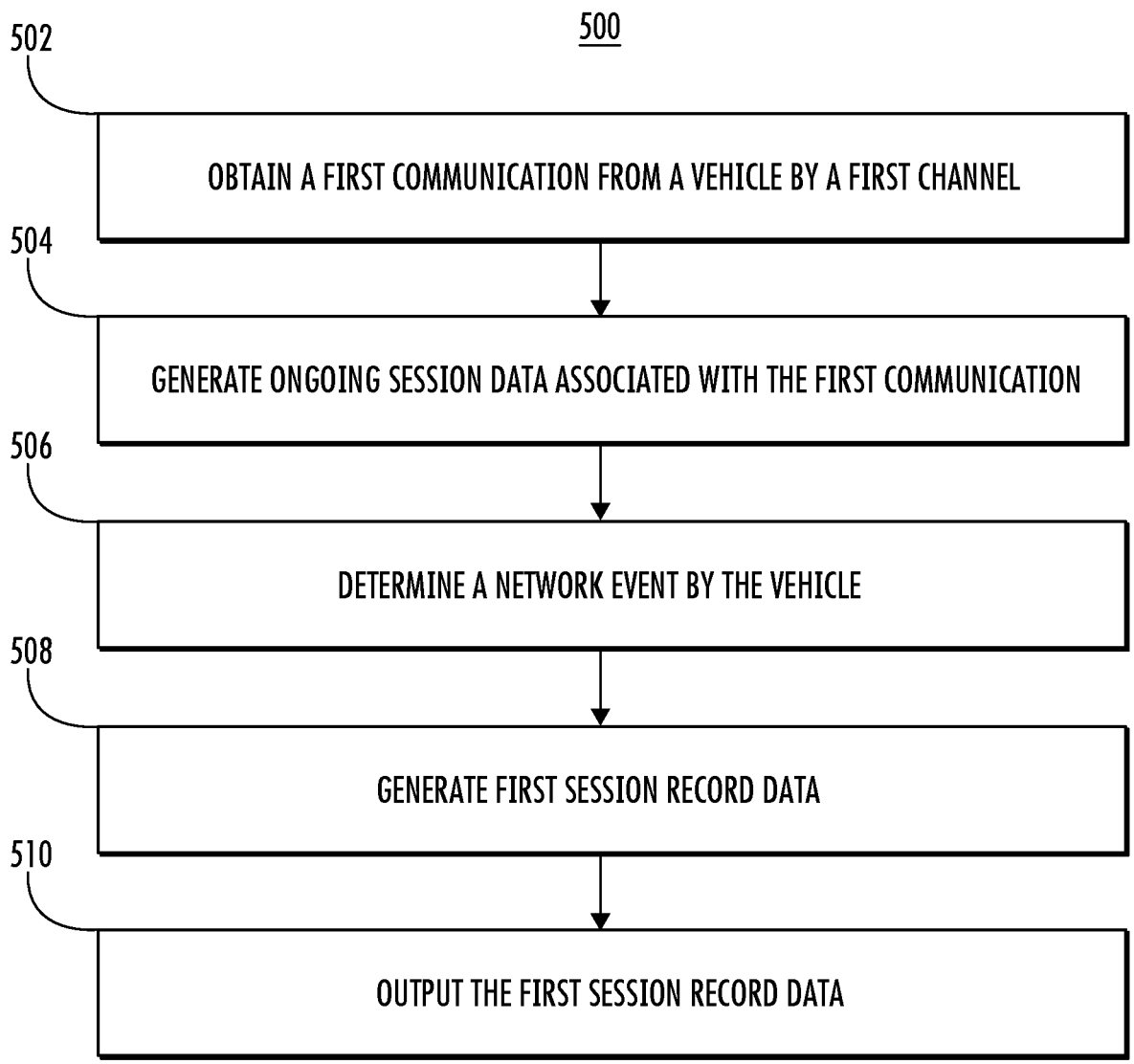
FIG. 5 depicts a flowchart diagram of a method for vehicle connection visibility according to example embodiments hereof.

FIG. 5 depicts a flowchart diagram of a method 500 for vehicle connection visibility according to example embodiments hereof. In an embodiment, the method 500 may be performed by a control circuit of a vehicle, such as the control circuit 135 of FIG. 1, the control circuit 915 of FIG. 9, or other suitable control circuit. One or more portions of the method 500 may be implemented as an algorithm on the hardware components of the devices described herein. For example, the steps of method 500 may be implemented as operations/instructions that are executable by computing hardware.

Although FIG. 5 depicts steps/operations performed in a particular order for purposes of illustration and discussion, the methods of the present disclosure are not limited to the particularly illustrated order or arrangement. The various steps/operations of the method 500 may be omitted, rearranged, combined, or adapted in various ways without deviating from the scope of the present disclosure.

In an embodiment, the method 500 may begin with or otherwise include a step 502, in which a computing system (e.g., the computing system 130, control circuit 915, etc.) obtains a first communication from a vehicle (e.g., a first vehicle) by a first channel. The vehicle and computing system may be capable of communication over a plurality of channels. Each of the channels may be associated with a (e.g., unique) communication protocol. For instance, the first channel may be associated with a first communication protocol. The first communication protocol may be any suitable protocol. In particular, in some implementations, the first communication protocol may be one of an SMS protocol, a HTTP protocol, or a MQTT protocol.

The computing system may obtain the first communication from the vehicle over a network. The network may be any type or form of network, such as a cellular network, a personal area network (PAN), a local-area network (LAN), e.g., Intranet, a metropolitan area network (MAN), a wide area network (WAN), or the Internet. The network may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol.

In some implementations, the vehicle may directly communicate with the vehicle visibility service. For instance, the vehicle may send the first communication directly to a network address associated with the vehicle visibility service. Additionally or alternatively, in some implementations, the vehicle may not communicate directly with the vehicle visibility service. For instance, in some implementations, the backend system may include one or more services that receive the first communication and route the first communication to the vehicle visibility service such that the vehicle visibility service may record session record data associated with the first communication. Furthermore, in some implementations, the backend system may route communications from multiple services that may or may not be associated with distinct functionality and/or communication protocols. However, in some implementations, the vehicle visibility service may be configured to generate unique session record data for each communication protocol.

As an example, in some implementations, obtaining the first communication from the (e.g., first) vehicle may include receiving the first communication from the vehicle at a first service in communication with the vehicle through the first communication protocol. The first service may be any suitable service other than the vehicle visibility service, such as, but not limited to, tele-assist services, navigation/routing services, performance monitoring services, etc. Obtaining the first communication from the vehicle may additionally include providing the first communication from the first service to a vehicle visibility service configured to generate the ongoing session data based on the first communication.

The method 500 of FIG. 5 may, in an embodiment, include a step 504, in which the computing system (e.g., the computing system 130, control circuit 915, etc.) generates ongoing session data associated with the first communication. The ongoing session data may define a first online session between the computing system and the vehicle over the first channel. For instance, the ongoing session data may record a start time of the session, a duration of the session, a vehicle identifier associated with the vehicle, a channel identifier associated with the first channel, an identifier associated with the computing system (and/or a service accessed by the vehicle on the computing system), and/or other suitable data for defining the first online session. In particular, in some implementations, the ongoing session data may be respective to the first channel such that if the vehicle is in communication with the computing system over a plurality of channels including the first channel, the ongoing session data records data associated only with the first channel (e.g., and not the other channels of the plurality of channels).

The method 500 of FIG. 5 may, in an embodiment, include a step 506, in which the computing system (e.g., the computing system 130, control circuit 915, etc.) determines a network event. The network event may be associated with an event timestamp. For instance, the event timestamp may record a time at which the network event occurred. The network event may be respective to the vehicle and the first online session associated with the first protocol. For instance, the network event may indicate a change in status of the first online session. As an example, in some implementations, the network event may be a disconnect event indicating that the vehicle has disconnected from the first online session. For instance, the vehicle may communicate a disconnect message indicating that a disconnect event has occurred.

As another example, the network event may be a duplicate session event indicating that the vehicle has initiated another session (e.g., over the first protocol) without properly closing the existing session. For instance, in some implementations, determining the network event includes determining that the vehicle has initiated a new online session with the computing system over the first channel and determining the event timestamp based on a timestamp associated with a most recent communication of the first online session.

As another example, the network event may be a timeout event indicating that the vehicle timed out while communicating with the computing system. As an example, in some implementations, determining the network event may include, subsequent to obtaining the first communication, initiating a disconnect countdown associated with the first online session. The disconnect countdown may represent a countdown until the vehicle is considered to have timed out or disconnected. Determining the network event may include resetting the disconnect countdown in response to receiving a subsequent communication from the vehicle. For instance, each time the computing system receives a message from the vehicle, it may reset the disconnect countdown such that the vehicle does not time out. Determining the network event may include determining that the disconnect countdown has expired (e.g., the vehicle has timed out). In response to determining that the disconnect countdown has expired, the vehicle may be considered to time out. When the disconnect countdown has expired, determining the event timestamp is based on a timestamp associated with a most recent communication from the vehicle. For instance, the timestamp associated with the last message the vehicle communicated before it timed out may be considered to be the event timestamp (e.g., as if the vehicle had properly disconnected).

The method 500 of FIG. 5 may, in an embodiment, include a step 508, in which the computing system (e.g., the computing system 130, control circuit 915, etc.) generates first session record data. For instance, in response to determining the network event, the computing system may generate first session record data associated with the first online session. The first session record data may include the event timestamp. For instance, the first session record data may record the event timestamp describing when the network event occurred, such as when the vehicle disconnected, timed out, or otherwise ceased communication with the backend system. Additionally or alternatively, the first session record data may identify the first channel. For instance, in some implementations, the first session record data may store a channel identifier corresponding to and/or identifying the first channel. Additionally or alternatively, in some implementations, the first session record data may include an initial timestamp associated with the first communication. For instance, the first session record data may record the duration of the first session, ranging from the initial timestamp to the event timestamp.

The method 500 of FIG. 5 may, in an embodiment, include a step 510, in which the computing system (e.g., the computing system 130, control circuit 915, etc.) outputs the first session record data. For instance, the computing system may output, for storage in a memory, the first session record data in a session history dataset associated with the vehicle. In particular, the first session record data may be stored in a session history dataset corresponding to the vehicle such that sessions across multiple channels for the vehicle may be recorded in the same session history dataset. As an example, the session history dataset associated with the vehicle may include at least second session record data for a second online session between the computing system and the vehicle over a second channel that is different from the first channel. In particular, in some implementations, the second channel may be associated with a second communication protocol that is different from the first communication protocol. In some implementations, the first communication protocol or the second communication protocol may include one or more of: an HTTP protocol; an SMS protocol; or an MQTT protocol. As one example, if the first communication protocol is an HTTP protocol, the second communication protocol may be a SMS protocol or an MQTT protocol.

In some implementations, the session history dataset associated with the vehicle may additionally include third session record data for a third online session between the computing system and the vehicle over a third channel that is different from the first channel and the second channel. In particular, in some implementations, the third channel may be associated with a third communication protocol. In some implementations, the third communication protocol may be the same as the first communication protocol or the second communication protocol. In some implementations, the third communication protocol is different from the first communication protocol and the second communication protocol. In some implementations, the first communication protocol, the second communication protocol, or the third communication protocol may respectively include one or more of: an HTTP protocol; an SMS protocol; or an MQTT protocol.

In one particular example of an implementation including respective first, second and third online sessions, the session history dataset associated with the first vehicle includes first session record data, second session record data, and third session record data. The first session record data may be indicative of a first online session between a computing system and the first vehicle over a first channel using the first communication protocol (e.g., an MQTT protocol). The second session record data may be indicative of a second online session between a computing system and the first vehicle over a second channel using a second communication protocol (e.g., an SMS protocol). The third session record data may be indicative of a third online session between the computing system and the first vehicle over the first channel or a new third channel using the first communication protocol (e.g., an MQTT protocol). In such example, one or more of the first online session, the second online session, or the third online session may be associated with a respective disconnect event indicating that the first vehicle has disconnected from respective communication channel after a period of time. In some instances, each online session terminates after a period of time and is thus associated with a respective disconnect event before or upon initiation of a subsequent online session. The first session record data, second session record data, and third session record data associated with the three respective online sessions may be recorded in the session history dataset.

One example session history database is depicted in Table 1 below. As illustrated, the session history database includes a vehicle identifier (e.g., a VIN), a session start time (e.g., an initial timestamp), a session end time (e.g., an event timestamp), as well as a generalized location of the vehicle and other details about the vehicle, in this case the year and model of the vehicle. Other session history databases can include similar and/or different information according to the needs of backend systems and services implementing aspects of the present disclosure.

TABLE 1

| TABLE 1 - EXAMPLE SESSION HISTORY DATABASE ENTRIES | | | | |
| --- | --- | --- | --- | --- |
| VIN | Session Start Time | Session End Time | Geography | Vehicle Details |
| ABCDEFGH123456789 | 2023-01-12T:13:17:19Z | 2023-01-12T:13:50:36Z | Los Angeles, CA, US | 2023 C300 |
| ABCDEFGH123456789 | 2023-01-12T:15:58:19Z | 2023-01-12T:16:50:29Z | Los Angeles, CA, US | 2023 C300 |
| RANDOM123456DEFG | 2023-01-13T:17:05:45Z | 2023-01-13T:17:50:30Z | Seattle, WA, US | 2022 GLE350 |
| RANDOM123456DEFG | 2023-01-14T:08:11:35Z | 2023-01-14T:09:29:45Z | Seattle, WA, US | 2022 GLE350 |
| VIN598675498AA87B | 2023-01-16T:12:25:31Z | 2023-01-16T:12:45:20Z | Miami, FL, US | 2023 S580 |

In some implementations, the session record data may be kept for a finite duration in the session history database. For instance, the session history database may store session record data for each session that is newer than a particular storage time (e.g., two weeks prior to the current time). The session history database may delete session record data that is older than the storage time (e.g., session record data for sessions occurring greater than two weeks ago). In addition, in some implementations, the session history database may be configured to maintain the most recent session for a vehicle indefinitely. For instance, the most recent session may be maintained as a record of when the vehicle last connected to the backend system, no matter how long ago that may have occurred.

Furthermore, in some implementations, the session history datasets for multiple vehicles may be stored in a session history database. The session history database may store session history datasets for a fleet of vehicles. As one example, in some implementations, the session history dataset associated with the vehicle is stored in a session history database including at least one or more second session history datasets associated with a fleet of vehicles including the vehicle.

Furthermore, in some implementations, the computing system (e.g., the control circuit) may further be configured to compute aggregate data for the (e.g., first) vehicle based on the session history dataset and the at least one or more second session history datasets associated with the fleet of vehicles including the vehicle. For instance, a user may query the session history database and/or the vehicle visibility service (e.g., by an analytics API) to request the aggregate data for the fleet of vehicles including the vehicle. The aggregate data may be determined relative to one or more analytic criteria. As examples, the analytic criteria may include vehicle-specific analytic criteria such as make, model, year, trim, options, color, operational status, etc. and/or environmental or operational criteria such as timeframe, geographic region, operator, owner, country, city, state, province, or other suitable criteria.

As one example, in some implementations, computing the aggregate data may include determining a quantity of online vehicles of the fleet of vehicles associated with one or more analytic criteria. For instance, the system may query the session history datasets for the fleet of vehicles to determine which vehicles are online. Additionally, the system may apply the analytic criteria to filter for vehicles that satisfy the analytic criteria. As another example, computing the aggregate data may include determining a quantitative ranking of online vehicles of the fleet of vehicles associated with the one or more analytic criteria. For instance, the system may determine which make, model, etc. is most active in a given geographic region (e.g., over a given timeframe). As another example, computing the aggregate data may include generating a traffic ranking of online vehicles of the fleet of vehicles based on a geographic region. For instance, the system may generate a traffic level for a region of the world over a specified period of time. The system may additionally or alternatively determine repetitions in the traffic pattern (e.g., does the traffic repeat daily or weekly, for a given holiday, etc.). As another example, computing the aggregate data may include determining a connectivity event in a region serviced by the fleet of vehicles based on the session history dataset. For instance, the system may determine whether an outage, lowered connectivity event, network traffic surge, or other suitable connectivity event is occurring in a region based on the session history datasets. As one example, the system may compare current traffic data to historical traffic data to detect significantly or unusually lowered traffic levels.

In some implementations, the control circuit is further configured to, prior to obtaining the first communication from the first vehicle, receive a confirmation message from an operator of the first vehicle. The confirmation message may authorize the control circuit to obtain the first communication from the first vehicle. For instance, in some implementations, in order to obtain the benefits of the techniques described herein, the user (e.g., of a vehicle) may be required to allow the collection and analysis of connectivity data and other data from the vehicle. For example, in some implementations, users may be provided with an opportunity to control whether programs or features collect such data. If the user does not allow collection and use of such data, then the user may not receive the benefits of the techniques described herein. The user may also be provided with tools to revoke or modify consent. In addition, certain information or data may be treated in one or more ways before it is stored or used, so that user information is protected. As another example, a computing device may perform most or all data processing on the device (e.g., and not on remote computing devices) such that personally-identifiable data is not transmitted to or recorded by other computing devices. Additionally and/or alternatively, systems and methods according to the present disclosure may act in a privacy-preserving manner such that applications on a computing device do not receive additional data (e.g., audio signals, semantic entities (e.g., unless requested by the application), video data, etc.) as a consequence of operation of the systems and methods. For example, an application may only receive data if a user expressly approves to share the data with the application. In some embodiments, the data may be filtered such that only data belonging to the consenting user of the vehicle is used.

Figure 6:
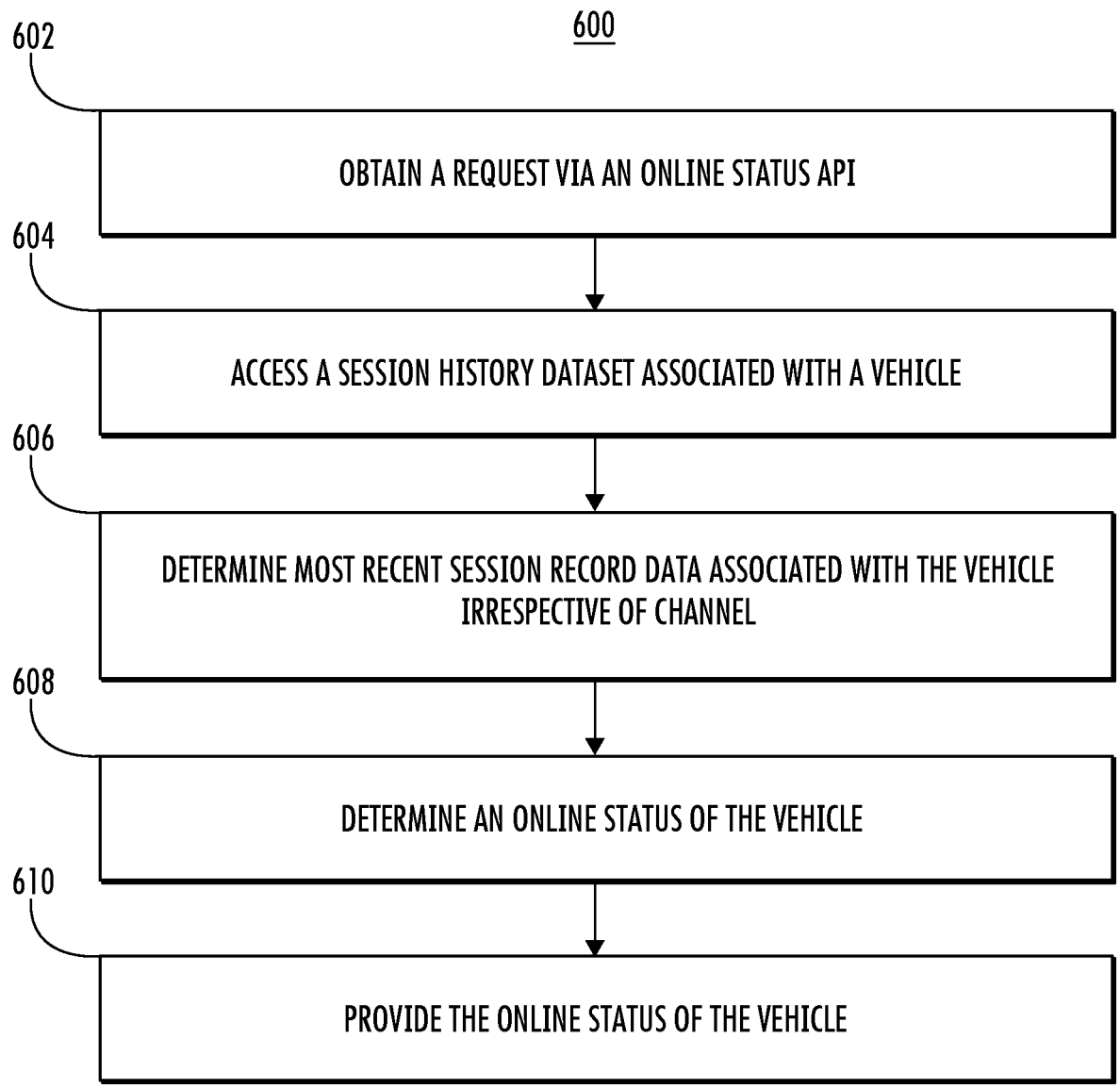
FIG. 6 depicts a flowchart diagram of a method for computing an online status of a vehicle according to example embodiments hereof.

FIG. 6 depicts a flowchart diagram of a method 600 for computing an online status of a vehicle according to example embodiments hereof. In an embodiment, the method 600 may be performed by a control circuit of a vehicle, such as the control circuit 135 of FIG. 1, the control circuit 915 of FIG. 9, or other suitable control circuit. One or more portions of the method 600 may be implemented as an algorithm on the hardware components of the devices described herein. For example, the steps of method 600 may be implemented as operations/instructions that are executable by computing hardware.

Although FIG. 6 depicts steps/operations performed in a particular order for purposes of illustration and discussion, the methods of the present disclosure are not limited to the particularly illustrated order or arrangement. The various steps/operations of the method 600 may be omitted, rearranged, combined, or adapted in various ways without deviating from the scope of the present disclosure.

In an embodiment, the method 600 may begin with or otherwise include a step 602, in which a computing system (e.g., the computing system 130, control circuit 915, etc.) obtains a request via an online status API. The online status API may be associated with, in communication with, or otherwise a component of a session history database. For instance, the online status API may provide for a user (e.g., a web portal), an external computing system, and/or other device to query the session history database to determine an online status of a vehicle. The request may include a vehicle identifier associated with the vehicle. The vehicle identifier may be any suitable identifier, such as, for example, a license plate number, a vehicle identification number (VIN), a network address, a unique digital identifier, and/or other suitable vehicle identifier.

The method 600 of FIG. 6 may, in an embodiment, include a step 604, in which the computing system (e.g., the computing system 130, control circuit 915, etc.) accesses a session history dataset associated with the vehicle. For instance, based on the vehicle identifier, the computing system may access the session history dataset associated with the vehicle. As one example, in some implementations, the session history database may store the session history datasets such that the session history datasets are accessed based on the vehicle identifier (e.g., through a query accepting the vehicle identifier as input.) In some implementations, the computing system may access a web portal that is in communication with online status API and/or the session history dataset.

The method 600 of FIG. 6 may, in an embodiment, include a step 606, in which the computing system (e.g., the computing system 130, control circuit 915, etc.) determines most recent session record data associated with the vehicle irrespective of channel. For instance, the computing system may consider session record data from all channels and determine the most recent session record data based on most recent session record data of each channel. As one example, in some implementations, determining most recent session record data associated with the vehicle irrespective of channel may include accessing most recent session record data associated with each of a plurality of channels for communication between the computing system and the first vehicle. For instance, in some implementations, the plurality of channels may include at least the first channel and the second channel described with respect to FIG. 5. Determining the most recent session record data may be based on a comparison of event timestamps of the most recent session record data associated with each of the plurality of channels. For instance, the computing system may select the session record data with the latest event timestamp as the most recent session record data.

The method 600 of FIG. 6 may, in an embodiment, include a step 608, in which the computing system (e.g., the computing system 130, control circuit 915, etc.) determines an online status of the vehicle. In particular, the computing system may determine the online status based on the event timestamp of the most recent session record data associated with the vehicle. The computing system may consider the online status of the vehicle to be offline if the event timestamp of the most recent session record data is older than an online threshold. For instance, if the event timestamp is older than a time typically associated with online communications (e.g., on the order of a few seconds, a few minutes, etc.) it may be likely that the vehicle is not currently communicating with the computing system (e.g., the vehicle visibility service). If, however, the event timestamp is a few seconds or even a few minutes old, the vehicle is like to be actively communicating with the computing system (e.g., the vehicle visibility service). The method 600 of FIG. 6 may, in an embodiment, include a step 608, in which the computing system (e.g., the computing system 130, control circuit 915, etc.) provides the online status of the first vehicle. For instance, the computing system may provide the online status (e.g., to the web portal, a user, etc.) via the online status API. The online status may include any suitable information about the current online state of the vehicle, such as whether the vehicle is currently online, the event timestamp associated with the most recent session record data, a channel identifier associated with the most recent session record data, an initial timestamp associated with the most recent session record data, and/or any other suitable data.

Figure 7:
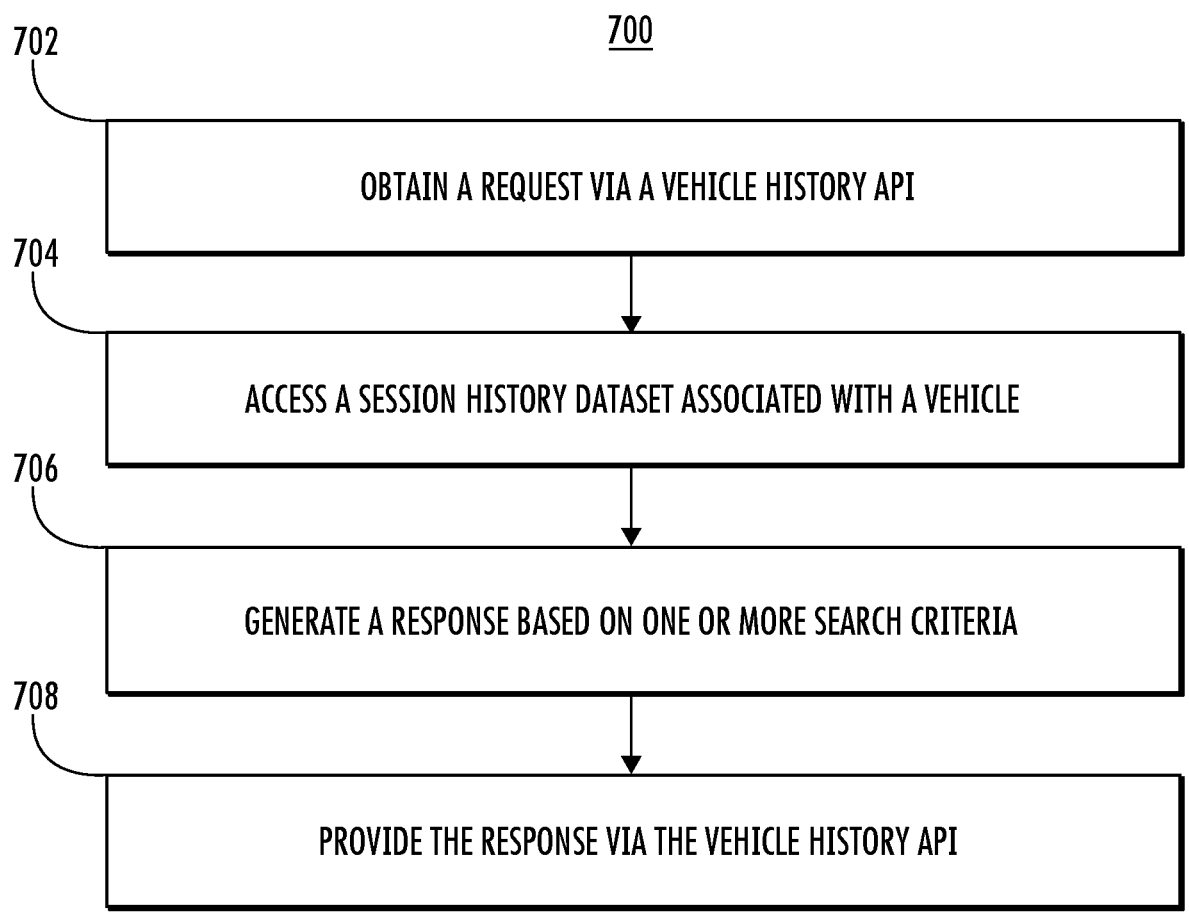
FIG. 7 depicts a flowchart diagram of a method for accessing a vehicle history according to example embodiments hereof.

FIG. 7 depicts a flowchart diagram of a method 700 for accessing a vehicle history according to example embodiments hereof. In an embodiment, the method 700 may be performed by a control circuit of a vehicle, such as the control circuit 135 of FIG. 1, the control circuit 915 of FIG. 9, or other suitable control circuit. One or more portions of the method 700 may be implemented as an algorithm on the hardware components of the devices described herein. For example, the steps of method 700 may be implemented as operations/instructions that are executable by computing hardware.

Although FIG. 7 depicts steps/operations performed in a particular order for purposes of illustration and discussion, the methods of the present disclosure are not limited to the particularly illustrated order or arrangement. The various steps/operations of the method 700 may be omitted, rearranged, combined, or adapted in various ways without deviating from the scope of the present disclosure.

In an embodiment, the method 700 may begin with or otherwise include a step 702, in which a computing system (e.g., the computing system 130, control circuit 915, etc.) obtains a request via a vehicle history API. The vehicle history API may be associated with, in communication with, or otherwise a component of a session history database. For instance, the vehicle history API may provide for a user (e.g., a web portal), an external computing system, and/or other device to query the session history database to determine a vehicle history of a vehicle. The vehicle history of the vehicle may include a session history dataset associated with the vehicle and/or be across all supported channels.

The request may include one or more search criteria. For instance, the search criteria may filter the session history datasets and/or session record data based on the one or more search criteria. For instance, in some implementations, the one or more search criteria may include at least a vehicle identifier. For instance, the session history dataset may be retrieved for the vehicle associated with the given vehicle identifier. Additionally or alternatively, the search criteria may include criteria to filter the session record data for a given vehicle, such as, for example, a timeframe, geographic region, channel identifier, or other suitable criteria.

The method 700 of FIG. 7 may, in an embodiment, include a step 704, in which the computing system (e.g., the computing system 130, control circuit 915, etc.) accesses a session history dataset associated with the vehicle. For instance, based on the vehicle identifier, the computing system may access the session history dataset associated with the vehicle. As one example, in some implementations, the session history database may store the session history datasets such that the session history datasets are accessed based on the vehicle identifier (e.g., through a query accepting the vehicle identifier as input.) In some implementations, the computing system may access a web portal that is in communication with online status API and/or the session history dataset.

The method 700 of FIG. 7 may, in an embodiment, include a step 706, in which the computing system (e.g., the computing system 130, control circuit 915, etc.) generates a response based on the one or more search criteria. In particular, the response may include returned session record data of the session history dataset. The returned session record data may satisfy the one or more search criteria. As one example, if a user searches for a vehicle history for a vehicle with a VIN of ABCDEF123456, and includes a search criterion for a geographic region in Los Angeles, California, the response will include session record data for each session that the vehicle ABCDEF123456 initiated while in the Los Angeles region.

The method 700 of FIG. 7 may, in an embodiment, include a step 708, in which the computing system (e.g., the computing system 130, control circuit 915, etc.) provides the response. For instance, the computing system may provide the response (e.g., to the web portal, a user, etc.) via the vehicle history API.

Figure 8:
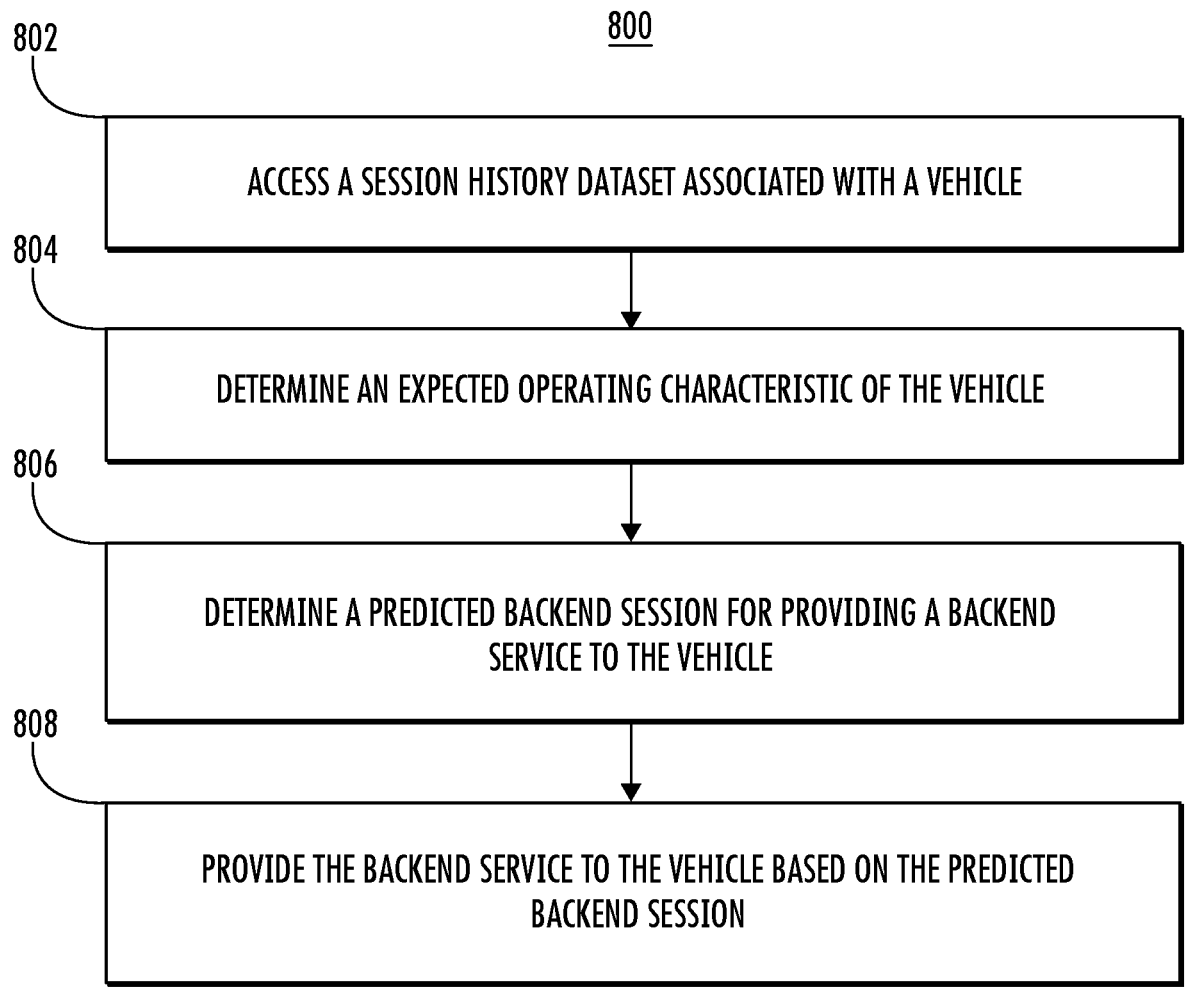
FIG. 8 depicts a flowchart diagram of a method for providing backend services according to example embodiments hereof.

FIG. 8 depicts a flowchart diagram of a method 800 for providing backend services according to example embodiments hereof. In an embodiment, the method 800 may be performed by a control circuit of a vehicle, such as the control circuit 135 of FIG. 1, the control circuit 915 of FIG. 9, or other suitable control circuit. One or more portions of the method 800 may be implemented as an algorithm on the hardware components of the devices described herein. For example, the steps of method 800 may be implemented as operations/instructions that are executable by computing hardware.

Although FIG. 8 depicts steps/operations performed in a particular order for purposes of illustration and discussion, the methods of the present disclosure are not limited to the particularly illustrated order or arrangement. The various steps/operations of the method 800 may be omitted, rearranged, combined, or adapted in various ways without deviating from the scope of the present disclosure.

In an embodiment, the method 800 may begin with or otherwise include a step 802, in which a computing system (e.g., the computing system 130, control circuit 915, etc.) accesses a session history dataset associated with a vehicle. For instance, based on a vehicle identifier corresponding to a vehicle, the computing system may access the session history dataset associated with the vehicle. As one example, in some implementations, the session history database may store the session history datasets such that the session history datasets are accessed based on the vehicle identifier (e.g., through a query accepting the vehicle identifier as input.) In some implementations, the computing system may access a web portal that is in communication with online status API and/or the session history dataset.

The method 800 of FIG. 8 may, in an embodiment, include a step 804, in which the computing system (e.g., the computing system 130, control circuit 915, etc.) determines (e.g., based on a session history dataset) an expected operating characteristic of the first vehicle. The expected operating characteristic may refer to a predicted characteristic of some future operation of the vehicle. As examples, the expected operating characteristic may be or may include at least one of an expected operating duration, an expected communication channel, or an expected operating time. The expected operating characteristic may be determined in any suitable example. For instance, in one example implementation, a machine-learned operating characteristic model may be trained on the session history database and/or similar data to learn to predict the expected operating characteristic.

The method 800 of FIG. 8 may, in an embodiment, include a step 806, in which the computing system (e.g., the computing system 130, control circuit 915, etc.) determines, based on the expected operating characteristic, a predicted backend session for providing a backend service to the vehicle. The predicted backend session may represent a preferred or optimal time for providing the backend service. As one example, the predicted backend session may represent a period in which the backend service may be provided without interfering a user's usage of the vehicle and/or where the user's usage of the vehicle will not interfere with the backend service. As one example, if the backend service is an over-the-air (OTA) update to software or firmware of the vehicle, the predicted backend session may be determined such that the update will not reduce the user's ability to operate the vehicle (e.g., during a time window that the user is unlikely to travel in the vehicle). As another example, if the backend service is a service such as downloading map data or otherwise preparing for a trip, the predicted backend session may be determined when it is likely that the user will perform the trip. In some implementations, the predicted backend service can be determined while the vehicle is in operation but during a timeframe when the vehicle is expected to maintain connectivity for an amount of time needed to complete the backend service. Such a determination can be made by comparing expected locations and timestamps of a planned vehicle route with known communication coverage areas. The method 800 of FIG. 8 may, in an embodiment, include a step 808, in which the computing system (e.g., the computing system 130, control circuit 915, etc.) provides the backend service to the first vehicle based on the predicted backend session. For instance, the backend service may be provided over one or more channels.

Example Computing Systems

Figure 9:
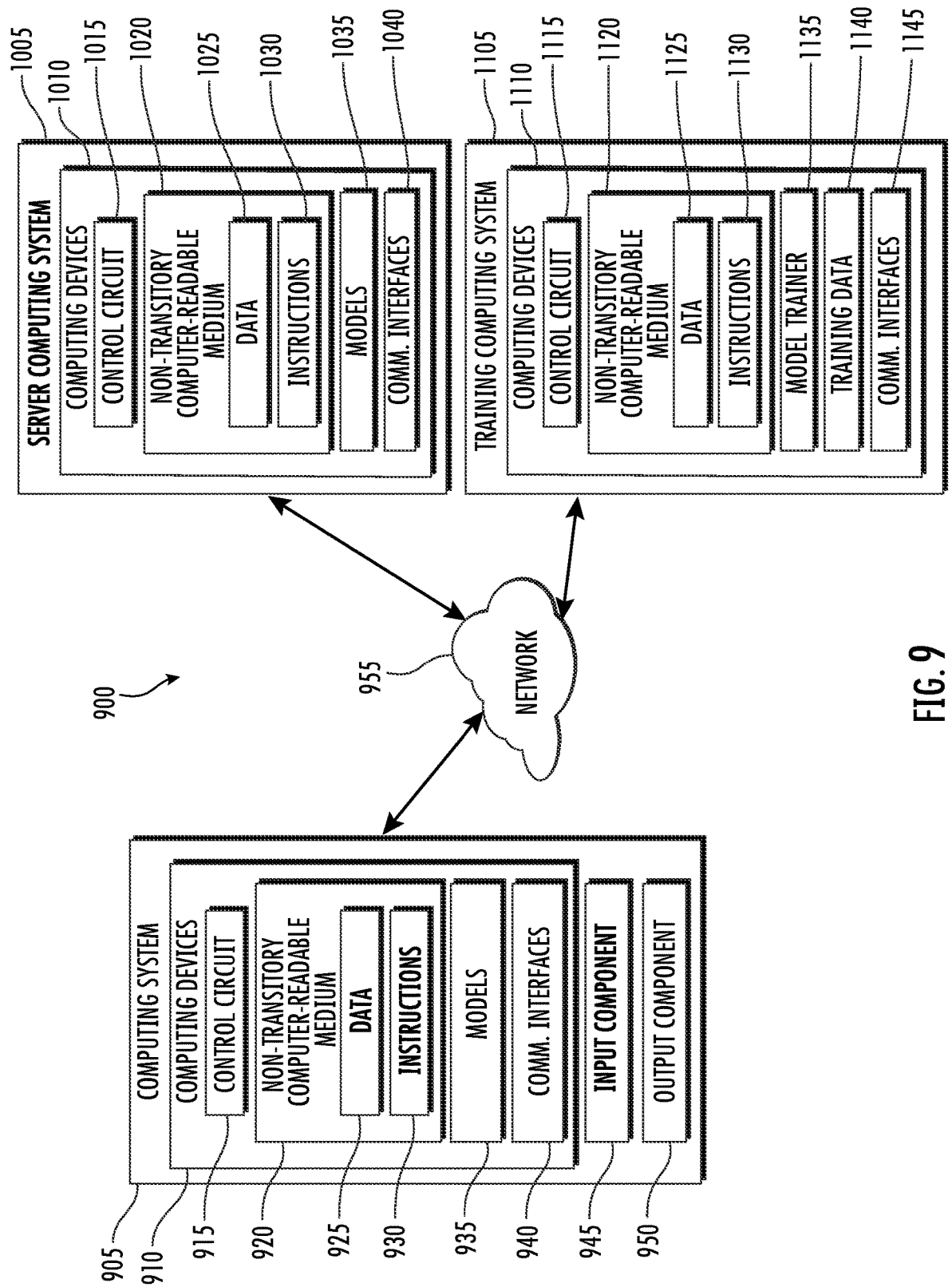
FIG. 9 depicts a diagram of a computing system according to example embodiments hereof.

FIG. 9 illustrates a block diagram of an example computing system 900 according to an embodiment hereof. The system 900 includes a computing system 905 (e.g., a computing system onboard a vehicle), a server computing system 1005 (e.g., a remote computing system, cloud computing platform), and a training computing system 1105 that are communicatively coupled over one or more networks 955.

The computing system 905 may include one or more computing devices 910 or circuitry. For instance, the computing system 905 may include a control circuit 915 and a non-transitory computer-readable medium 920, also referred to herein as memory. In an embodiment, the control circuit 915 may include one or more processing cores, a programmable logic circuit (PLC) or a programmable logic/gate array (PLA/PGA), a field programmable gate array (FPGA), an application specific integrated circuit (ASIC), or any other control circuit. In some implementations, the control circuit 915 may be part of, or may form, a vehicle control unit (also referred to as a vehicle controller) that is embedded or otherwise disposed in a vehicle (e.g., a Mercedes-Benz® car or van). For example, the vehicle controller may be or may include an infotainment system controller (e.g., an infotainment head-unit), a telematics control unit (TCU), an electronic control unit (ECU), a central powertrain controller (CPC), a charging controller, a central exterior & interior controller (CEIC), a zone controller, or any other controller. In an embodiment, the control circuit 915 may be programmed by one or more computer-readable or computer-executable instructions stored on the non-transitory computer-readable medium 920.

In an embodiment, the non-transitory computer-readable medium 920 may be a memory device, also referred to as a data storage device, which may include an electronic storage device, a magnetic storage device, an optical storage device, an electromagnetic storage device, a semiconductor storage device, or any suitable combination thereof. The non-transitory computer-readable medium 920 may form, e.g., a hard disk drive (HDD), a solid-state drive (SDD) or solid-state integrated memory, a random-access memory (RAM), a read-only memory (ROM), an erasable programmable read-only memory (EPROM or Flash memory), a static random-access memory (SRAM), dynamic random-access memory (DRAM), a portable compact disc read-only memory (CD-ROM), a digital versatile disk (DVD), or a memory stick.

The non-transitory computer-readable medium 920 may store information that may be accessed by the control circuit 915. For instance, the non-transitory computer-readable medium 920 (e.g., memory devices) may store data 925 that may be obtained, received, accessed, written, manipulated, created, or stored. The data 925 may include, for instance, any of the data or information described herein. In an embodiment, the computing system 905 may obtain data from one or more memories that are remote from the computing system 905.

The non-transitory computer-readable medium 920 may also store computer-readable instructions 930 that may be executed by the control circuit 915. The instructions 930 may be software written in any suitable programming language or may be implemented in hardware. The instructions may include computer-readable instructions, computer-executable instructions, etc. As described herein, in various embodiments, the terms "computer-readable instructions"

and "computer-executable instructions" are used to describe software instructions or computer code configured to carry out various tasks and operations. In various embodiments, if the computer-readable or computer-executable instructions form modules, the term "module" refers broadly to a collection of software instructions or code configured to cause the control circuit 915 to perform one or more functional tasks. The modules and computer-readable/executable instructions may be described as performing various operations or tasks when the control circuit 915 or other hardware component is executing the modules or computer-readable instructions.

The instructions 930 may be executed in logically or virtually separate threads on the control circuit 915. For example, the non-transitory computer-readable medium 920 may store instructions 930 that when executed by the control circuit 915 cause the control circuit 915 to perform any of the operations, methods or processes described herein. In some cases, the non-transitory computer-readable medium 920 may store computer-executable instructions or computer-readable instructions, such as instructions to perform at least a portion of the method(s) of FIGS. 5 through 8.

In an embodiment, the computing system 905 may store or include one or more machine-learned models 935. In an embodiment, the one or more machine-learned models 935 may be received from the server computing system 1005 over networks 955, stored in the computing system 905 (e.g., non-transitory computer-readable medium 920), and then used or otherwise implemented by the control circuit 915. In an embodiment, the computing system 905 may implement multiple parallel instances of a single model.

Additionally, or alternatively, one or more machine-learned models 935 may be included in or otherwise stored and implemented by the server computing system 1005 that communicates with the computing system 905 according to a client-server relationship. For example, the machine-learned models 935 may be implemented by the server computing system 1005 as a portion of a web service. Thus, one or more models 935 may be stored and implemented at the computing system 905 or one or more models 935 may be stored and implemented at the server computing system 1005. For example, the one or more models 935 may be trained to perform the functions and operations described herein for formulating the vehicle platoons.

The computing system 905 may include a communication interface 940. The communication interface 940 may be used to communicate with one or more other system(s). The communication interface 940 may include any circuits, components, software, etc. for communicating via one or more networks (e.g., networks 955). In an embodiment, the communication interface 940 may include for example, one or more of a communications controller, receiver, transceiver, transmitter, port, conductors, software or hardware for communicating data/information.

The computing system 905 may also include one or more user input components 945 that receives user input. For example, the user input component 945 may be a touch-sensitive component (e.g., a touch-sensitive display screen or a touch pad) that is sensitive to the touch of a user input object (e.g., a finger or a stylus). The touch-sensitive component may serve to implement a virtual keyboard. Other example user input components include a microphone, a traditional keyboard, cursor-device, joystick, or other devices by which a user may provide user input. As one example, the user input component(s) 945 may be or may include an infotainment system within a vehicle.

The computing system 905 may include one or more output components 950. The output components 950 may include hardware or software for audibly or visual producing content. For instance, the output components 950 may include one or more speaker(s), earpiece(s), headset(s), handset(s), etc. The output components 950 may include a display device, which may include hardware for displaying a user interface or messages for a user. By way of example, the output component 950 may include a display screen, CRT, LCD, plasma screen, touch screen, TV, projector, tablet, or other suitable display components. As one example, the output component(s) 950 may be or may include an infotainment system within a vehicle.

The server computing system 1005 may include one or more computing devices 1010. In an embodiment, the server computing system 1005 may include or is otherwise implemented by one or more server computing devices. In instances in which the server computing system 1005 includes plural server computing devices, such server computing devices may operate according to sequential computing architectures, parallel computing architectures, or some combination thereof.

The server computing system 1005 may include a control circuit 1015 and a non-transitory computer-readable medium 1020, also referred to herein as memory 1020. In an embodiment, the control circuit 1015 may include one or more processors (e.g., microprocessors), one or more processing cores, a programmable logic circuit (PLC) or a programmable logic/gate array (PLA/PGA), a field programmable gate array (FPGA), an application specific integrated circuit (ASIC), or any other control circuit. In an embodiment, the control circuit 1015 may be programmed by one or more computer-readable or computer-executable instructions stored on the non-transitory computer-readable medium 1020.

In an embodiment, the non-transitory computer-readable medium 1020 may be a memory device, also referred to as a data storage device, which may include an electronic storage device, a magnetic storage device, an optical storage device, an electromagnetic storage device, a semiconductor storage device, or any suitable combination thereof. The non-transitory computer-readable medium may form, e.g., a hard disk drive (HDD), a solid-state drive (SDD) or solid-state integrated memory, a random-access memory (RAM), a read-only memory (ROM), an erasable programmable read-only memory (EPROM or Flash memory), a static random-access memory (SRAM), dynamic random-access memory (DRAM), a portable compact disc read-only memory (CD-ROM), a digital versatile disk (DVD), or a memory stick.

The non-transitory computer-readable medium 1020 may store information that may be accessed by the control circuit 1015. For instance, the non-transitory computer-readable medium 1020 (e.g., memory devices) may store data 1025 that may be obtained, received, accessed, written, manipulated, created, or stored. The data 1025 may include, for instance, any of the data or information described herein. In an embodiment, the server computing system 1005 may obtain data from one or more memories that are remote from the server computing system 1005.

The non-transitory computer-readable medium 1020 may also store computer-readable instructions 1030 that may be executed by the control circuit 1015. The instructions 1030 may be software written in any suitable programming language or may be implemented in hardware. The instructions may include computer-readable instructions, computer-executable instructions, etc. As described herein, in various embodiments, the terms "computer-readable instructions" and "computer-executable instructions" are used to describe software instructions or computer code configured to carry out various tasks and operations. In various embodiments, if the computer-readable or computer-executable instructions form modules, the term "module" refers broadly to a collection of software instructions or code configured to cause the control circuit 1015 to perform one or more functional tasks. The modules and computer-readable/executable instructions may be described as performing various operations or tasks when the control circuit 1015 or other hardware component is executing the modules or computer-readable instructions.

The instructions 1030 may be executed in logically or virtually separate threads on the control circuit 1015. For example, the non-transitory computer-readable medium 1020 may store instructions 1030 that when executed by the control circuit 1015 cause the control circuit 1015 to perform any of the operations, methods or processes described herein. In some cases, the non-transitory computer-readable medium 1020 may store computer-executable instructions or computer-readable instructions, such as instructions to perform at least a portion of the method(s) of FIGS. 5 through 8.

The server computing system 1005 may store or otherwise include one or more machine-learned models 1035. The machine-learned models 1035 may include or be the same as the models 935 stored in computing system 905. In an embodiment, the machine-learned models 1035 may include an unsupervised learning model (e.g., for generating data clusters). In an embodiment, the machine-learned models 1035 may include neural networks (e.g., deep neural networks) or other types of machine-learned models, including non-linear models or linear models. Neural networks may include feed-forward neural networks, recurrent neural networks (e.g., long short-term memory recurrent neural networks), convolutional neural networks or other forms of neural networks. Some example machine-learned models may leverage an attention mechanism such as self-attention. For example, some example machine-learned models may include multi-headed self-attention models (e.g., transformer models).

The server computing system 1005 may include a communication interface 1040. The communication interface 1040 may be used to communicate with one or more other system(s). The communication interface 1040 may include any circuits, components, software, etc. for communicating via one or more networks (e.g., networks 955). In an embodiment, the communication interface 1040 may include for example, one or more of a communications controller, receiver, transceiver, transmitter, port, conductors, software or hardware for communicating data/information.

The computing system 905 or the server computing system 1005 may train the models 935, 1035 via interaction with the training computing system 1105 that is communicatively coupled over the networks 955. The training computing system 1105 may be separate from the server computing system 1005 or may be a portion of the server computing system 1005.

The training computing system 1105 may include one or more computing devices 1110. In an embodiment, the training computing system 1105 may include or is otherwise implemented by one or more server computing devices. In instances in which the training computing system 1105 includes plural server computing devices, such server computing devices may operate according to sequential computing architectures, parallel computing architectures, or some combination thereof.

The training computing system 1105 may include a control circuit 1115 and a non-transitory computer-readable medium 1120, also referred to herein as memory 1120. In an embodiment, the control circuit 1115 may include one or more processors (e.g., microprocessors), one or more processing cores, a programmable logic circuit (PLC) or a programmable logic/gate array (PLA/PGA), a field programmable gate array (FPGA), an application specific integrated circuit (ASIC), or any other control circuit. In an embodiment, the control circuit 1115 may be programmed by one or more computer-readable or computer-executable instructions stored on the non-transitory computer-readable medium 1120.

In an embodiment, the non-transitory computer-readable medium 1120 may be a memory device, also referred to as a data storage device, which may include an electronic storage device, a magnetic storage device, an optical storage device, an electromagnetic storage device, a semiconductor storage device, or any suitable combination thereof. The non-transitory computer-readable medium may form, e.g., a hard disk drive (HDD), a solid-state drive (SDD) or solid-state integrated memory, a random-access memory (RAM), a read-only memory (ROM), an erasable programmable read-only memory (EPROM or Flash memory), a static random-access memory (SRAM), dynamic random-access memory (DRAM), a portable compact disc read-only memory (CD-ROM), a digital versatile disk (DVD), or a memory stick.

The non-transitory computer-readable medium 1120 may store information that may be accessed by the control circuit 1115. For instance, the non-transitory computer-readable medium 1120 (e.g., memory devices) may store data 1125 that may be obtained, received, accessed, written, manipulated, created, or stored. The data 1125 may include, for instance, any of the data or information described herein, such as data relating to a simulated environment. In an embodiment, the training computing system 1105 may obtain data from one or more memories that are remote from the training computing system 1105.

The non-transitory computer-readable medium 1120 may also store computer-readable instructions 1130 that may be executed by the control circuit 1115. The instructions 1130 may be software written in any suitable programming language or may be implemented in hardware. The instructions may include computer-readable instructions, computer-executable instructions, etc. As described herein, in various embodiments, the terms "computer-readable instructions" and "computer-executable instructions" are used to describe software instructions or computer code configured to carry out various tasks and operations. In various embodiments, if the computer-readable or computer-executable instructions form modules, the term "module" refers broadly to a collection of software instructions or code configured to cause the control circuit 1115 to perform one or more functional tasks. The modules and computer-readable/executable instructions may be described as performing various operations or tasks when the control circuit 1115 or other hardware component is executing the modules or computer-readable instructions.

The instructions 1130 may be executed in logically or virtually separate threads on the control circuit 1115. For example, the non-transitory computer-readable medium 1120 may store instructions 1130 that when executed by the control circuit 1115 cause the control circuit 1115 to perform any of the operations, methods or processes described herein. In some cases, the non-transitory computer-readable medium 1120 may store computer-executable instructions or computer-readable instructions, such as instructions to perform at least a portion of the method(s) of FIGS. 5 through 8.

The training computing system 1105 may include a model trainer 1135 that trains the machine-learned models 935, 1035 stored at the computing system 905 or the server computing system 1005 using various training or learning techniques. For example, the models 935, 1035 (e.g., a machine-learned model for determining vehicle connection visibility) may be trained using a simulated environment technique in which a simulated representation of a travelway created from existing sensor data or motion data is used to train the models 935, 1035.

In some implementations, the model trainer may train the models 935, 1035 (e.g., a machine-learned vehicle connection visibility model) in an unsupervised fashion.

The computing system may modify parameters of the models 935, 1035 based on the loss function such that the models may be effectively trained for specific applications in an unsupervised manner without labeled data.

The model trainer 1135 may utilize training techniques, such as backwards propagation of errors. For example, a loss function may be backpropagated through a model to update one or more parameters of the models (e.g., based on a gradient of the loss function). Various loss functions may be used such as mean squared error, likelihood loss, cross entropy loss, hinge loss, or various other loss functions. Gradient descent techniques may be used to iteratively update the parameters over a number of training iterations.

In an embodiment, performing backwards propagation of errors may include performing truncated backpropagation through time. The model trainer 1135 may perform a number of generalization techniques (e.g., weight decays, dropouts, etc.) to improve the generalization capability of a model being trained. In particular, the model trainer 1135 may train the machine-learned models 935, 1035 based on a set of training data 1140.

The training data 1140 may include unlabeled training data for training in an unsupervised fashion. The training data 1140 may include datasets of vehicle characteristics, models, classes, types, etc. as well as example communication data and connection visibility data. The model trainer 1135 may train the models 935, 1035 to determine ongoing session data associated with various vehicle communications and to output session record data associated therewith. In some implementations, the model trainer 1135 may train the models 935, 1035 to generate responses via one or more of a vehicle history API, an online status API, or a backend service API.

The model trainer 1135 may include computer logic utilized to provide desired functionality. The model trainer 1135 may be implemented in hardware, firmware, or software controlling a general-purpose processor. For example, in an embodiment, the model trainer 1135 may include program files stored on a storage device, loaded into a memory and executed by one or more processors. In other implementations, the model trainer 1135 may include one or more sets of computer-executable instructions that are stored in a tangible computer-readable storage medium such as RAM, hard disk, or optical or magnetic media.

The training computing system 1105 may include a communication interface 1145. The communication interface 1145 may be used to communicate with one or more other system(s). The communication interface 1145 may include any circuits, components, software, etc. for communicating via one or more networks (e.g., networks 955). In an embodiment, the communication interface 1145 may include for example, one or more of a communications controller, receiver, transceiver, transmitter, port, conductors, software or hardware for communicating data/information.

The networks 955 may be any type of communications network, such as a local area network (e.g., intranet), wide area network (e.g., Internet), or some combination thereof and may include any number of wired or wireless links. In general, communication over the network 955 may be carried via any type of wired or wireless connection, using a wide variety of communication protocols (e.g., TCP/IP, HTTP, SMTP, FTP), encodings or formats (e.g., HTML, XML), or protection schemes (e.g., VPN, secure HTTP, SSL).

The machine-learned models described in this specification may have various types of input data or combinations thereof, representing data available to other systems onboard a vehicle. Input data may include, for example, latent encoding data (e.g., a latent space representation of an input, etc.), statistical data (e.g., data computed or calculated from some other data source), sensor data (e.g., raw or processed data captured by a sensor of the vehicle), or other types of data.

FIG. 9 illustrates one example computing system that may be used to implement the present disclosure. Other computing systems may be used as well. For example, in an embodiment, the computing system 905 may include the model trainer 1135 and the training data 1140. In such implementations, the models 935 may be both trained and used locally at the computing system 905. In some of such implementations, the computing system 905 may implement the model trainer 1135 to personalize the models 935 based on user-specific data.

Additional Discussion of Various Embodiments

Embodiment 1 relates to a computing system. The computing system may include a control circuit of a first vehicle. The control circuit may be configured to obtain, over a network, a first communication from a first vehicle by a first channel, the first channel associated with a first communication protocol. The control circuit may be configured to generate ongoing session data associated with the first communication, the ongoing session data defining a first online session between the computing system and the first vehicle over the first channel. The control circuit may be configured to determine, by the control circuit, a network event associated with the first vehicle from the first online session associated with the first communication protocol, wherein the network event is associated with an event timestamp. The control circuit may be configured to, in response to determining the network event, generate first session record data associated with the first online session, the first session record data comprising the event timestamp and identifying the first channel. The control circuit may be configured to output, for storage in a memory, the first session record data in a session history dataset associated with the first vehicle. The session history dataset associated with the first vehicle comprises at least second session record data for a second online session between the computing system and the first vehicle over a second channel that is different from the first channel, the second channel associated with a second communication protocol that is different from the first communication protocol.

Embodiment 2 includes the computing system of Embodiment 1. In this embodiment, the session history dataset associated with the first vehicle is stored in a session history database comprising at least one or more second session history datasets associated with a fleet of vehicles comprising the first vehicle and the control circuit is further configured to compute aggregate data for the first vehicle based on the session history dataset and the at least one or more second session history datasets associated with the fleet of vehicles comprising the first vehicle.

Embodiment 3 includes the computing system of Embodiment 1 or 2. In this embodiment, the control circuit is further configured to: obtain a request via an online status API of the session history database, the request comprising a vehicle identifier associated with the first vehicle; based on the vehicle identifier, access the session history dataset associated with the first vehicle; determine most recent session record data associated with the first vehicle irrespective of channel; determine an online status of the first vehicle based on an event timestamp of the most recent session record data associated with the first vehicle; and provide the online status of the first vehicle via the online status API.

Embodiment 4 includes the computing system of any one of Embodiments 1 through 3. In this embodiment, determining most recent session record data associated with the first vehicle irrespective of channel comprises: accessing most recent session record data associated with each of a plurality of channels for communication between the computing system and the first vehicle, the plurality of channels including the first channel and the second channel; and determining the most recent session record data associated with the first vehicle based on a comparison of event timestamps of the most recent session record data associated with each of the plurality of channels.

Embodiment 5 includes the computing system of any one of Embodiments 1 through 4. In this embodiment, the control circuit is further configured to: obtain a request via a vehicle history API, the request comprising one or more search criteria, the one or more search criteria comprising at least a vehicle identifier; based on the vehicle identifier, access the session history dataset associated with the first vehicle; generate a response based on the one or more search criteria, the response comprising returned session record data of the session history dataset, the returned session record data satisfying the one or more search criteria; and provide the response via the vehicle history API.

Embodiment 6 includes the computing system of any one of Embodiments 1 through 5. In this embodiment, computing the aggregate data comprises at least one of: determining a quantity of online vehicles of the fleet of vehicles associated with one or more analytic criteria; determining a quantitative ranking of online vehicles of the fleet of vehicles associated with the one or more analytic criteria; generating a traffic ranking of online vehicles of the fleet of vehicles based on a geographic region; or determining a connectivity event in a region serviced by the fleet of vehicles based on the session history dataset.

Embodiment 7 includes the computing system of any one of Embodiments 1 through 6. In this embodiment, the first communication protocol or the second communication protocol comprise one or more of: an HTTP protocol; an SMS protocol; or an MQTT protocol.

Embodiment 8 includes the computing system of any one of Embodiments 1 through 7. In this embodiment, the network event comprises a disconnect event indicating that the first vehicle has disconnected from the first online session.

Embodiment 9 includes the computing system of any one of Embodiments 1 through 8. In this embodiment, determining the network event comprises: subsequent to obtaining the first communication, initiating a disconnect countdown associated with the first online session; resetting the disconnect countdown in response to receiving a subsequent communication from the first vehicle; determining that the disconnect countdown has expired; and, in response to determining that the disconnect countdown has expired, determining the event timestamp based on a timestamp associated with a most recent communication from the first vehicle.

Embodiment 10 includes the computing system of any one of Embodiments 1 through 9. In this embodiment, determining the network event comprises determining that the first vehicle has initiated a new online session with the computing system over the first channel and determining the event timestamp based on a timestamp associated with a most recent communication of the first online session.

Embodiment 11 includes the computing system of any one of Embodiments 1 through 10. In this embodiment, the control circuit is further configured to: determine, based on the session history dataset, an expected operating characteristic of the first vehicle, the expected operating characteristic comprising at least one of an expected operating duration, an expected communication channel, or an expected operating time; determine, based on the expected operating characteristic, a predicted backend session for providing a backend service to the first vehicle; and provide the backend service to the first vehicle based on the predicted backend session.

Embodiment 12 includes the computing system of any one of Embodiments 1 through 11. In this embodiment, obtaining the first communication from the first vehicle comprises: receiving the first communication from the first vehicle at a first service in communication with the first vehicle through the first communication protocol; and providing the first communication from the first service to a vehicle visibility service configured to generate the ongoing session data based on the first communication.

Embodiment 13 includes the computing system of any one of Embodiments 1 through 12. In this embodiment, the control circuit is further configured to, prior to obtaining the first communication from the first vehicle, receive a confirmation message from an operator of the first vehicle, the confirmation message authorizing the control circuit to obtain the first communication from the first vehicle.

Embodiment 14 includes the computing system of any one of Embodiments 1 through 13. In this embodiment, the first session record data comprises an initial timestamp associated with the first communication.

Embodiment 15 includes the computing system of any one of Embodiments 1 through 14. In this embodiment, the session history dataset associated with the first vehicle comprises third session record data for a third online session between the computing system and the first vehicle over the first channel using the first communication protocol; and one or more of the first online session, the second online session, or the third online session are associated with a respective disconnect event indicating that the first vehicle has disconnected from the one or more of the first online session, the second online session, or the third online session.

Embodiment 16 relates to a computer-implemented method. The computer-implemented method may include obtaining, over a network, a first communication from a first vehicle by a first channel, the first channel associated with a first communication protocol. The computer-implemented method may include generating ongoing session data associated with the first communication, the ongoing session data defining a first online session between the computing system and the first vehicle over the first channel. The computer-implemented method may include determining a network event by the first vehicle from the first online session associated with the first communication protocol, wherein the network event is associated with an event timestamp. The computer-implemented method may include, in response to determining the disconnection, generating first session record data associated with the first online session, the first session record data comprising the event timestamp and identifying the first channel. The computer-implemented method may include outputting, for storage in a memory, the first session record data in a session history dataset associated with the first vehicle, wherein the session history dataset associated with the first vehicle comprises at least second session record data for a second online session between the computing system and the first vehicle over a second channel that is different from the first channel, the second channel associated with a second communication protocol that is different from the first communication protocol. The computer-implemented method may include computing aggregate data for the first vehicle based on the session history dataset and at least one or more second session history datasets associated with a fleet of vehicles comprising the first vehicle.

Embodiment 17 includes the computer-implemented method of one of Embodiment 15 or 16. In this embodiment, the computer-implemented method further comprises obtaining a request via an online status API of the session history database, the request comprising a vehicle identifier associated with the first vehicle; based on the vehicle identifier, accessing the session history dataset associated with the first vehicle; determining most recent session record data associated with the first vehicle irrespective of channel; determining an online status of the first vehicle based on an event timestamp of the most recent session record data associated with the first vehicle; and providing the online status of the first vehicle via the online status API.

Embodiment 18 includes the computer-implemented method of any one of Embodiments 15 through 17. In this embodiment, the computer-implemented method further comprises obtaining a request via a vehicle history API, the request comprising one or more search criteria, the one or more search criteria comprising at least a vehicle identifier and one or more of a channel identifier, a timeframe, or a geographic region; based on the vehicle identifier, accessing the session history dataset associated with the first vehicle; generating a response based on the one or more search criteria; the response comprising session record data of the session history dataset that conform to the one or more search criteria; and providing the response via the vehicle history API.

Embodiment 19 includes the computer-implemented method of any one of Embodiments 15 through 18. In this embodiment, the computer-implemented method further comprises determining, based on the session history dataset, an expected operating characteristic of the first vehicle, the expected operating characteristic comprising at least one of an expected operating duration, an expected communication channel, or an expected operating time; determining, based on the expected operating characteristic, a predicted backend session for providing a backend service to the first vehicle; and providing the backend service to the first vehicle based on the predicted backend session.

Embodiment 20 relates to one or more non-transitory computer-readable media that store instructions that are executable by a control circuit. The instructions, when executed, may cause the control circuit to obtain, over a network, a first communication from a first vehicle by a first channel, the first channel associated with a first communication protocol. The instructions, when executed, may cause the control circuit to generate ongoing session data associated with the first communication, the ongoing session data defining a first online session between the computing system and the first vehicle over the first channel. The instructions, when executed, may cause the control circuit to determine, by the control circuit, a network event associated with the first vehicle from the first online session associated with the first communication protocol, wherein the network event is associated with an event timestamp. The instructions, when executed, may cause the control circuit to, in response to determining the disconnection, generate first session record data associated with the first online session, the first session record data comprising the event timestamp and identifying the first channel. The instructions, when executed, may cause the control circuit to output, for storage in a memory, the first session record data in a session history dataset associated with the first vehicle. The session history dataset associated with the first vehicle comprises at least second session record data for a second online session between the computing system and the first vehicle over a second channel that is different from the first channel, the second channel associated with a second communication protocol that is different from the first communication protocol.

Additional Disclosure

As used herein, adjectives and their possessive forms are intended to be used interchangeably unless apparent otherwise from the context or expressly indicated. For instance, "component of a/the vehicle" may be used interchangeably with "vehicle component" where appropriate. Similarly, words, phrases, and other disclosure herein is intended to cover obvious variants and synonyms even if such variants and synonyms are not explicitly listed.

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein may be implemented using a single device or component or multiple devices or components working in combination. Databases and applications may be implemented on a single system or distributed across multiple systems. Distributed components may operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, may readily produce alterations to, variations of, and equivalents to such embodiments. Accordingly, the subject disclosure does not preclude inclusion of such modifications, variations or additions to the present subject matter as would be readily apparent to one of ordinary skill in the art. For instance, features illustrated or described as part of one embodiment may be used with another embodiment to yield a still further embodiment. Thus, it is intended that the present disclosure cover such alterations, variations, and equivalents.

Aspects of the disclosure have been described in terms of illustrative implementations thereof. Numerous other implementations, modifications, or variations within the scope and spirit of the appended claims may occur to persons of ordinary skill in the art from a review of this disclosure. Any and all features in the following claims may be combined or rearranged in any way possible. Accordingly, the scope of the present disclosure is by way of example rather than by way of limitation, and the subject disclosure does not preclude inclusion of such modifications, variations or additions to the present subject matter as would be readily apparent to one of ordinary skill in the art. Moreover, terms are described herein using lists of example elements joined by conjunctions such as "and," "or," "but," etc. It should be understood that such conjunctions are provided for explanatory purposes only. The term "and/or" and "or" may be used interchangeably herein. Lists joined by a particular conjunction such as "or," for example, may refer to "at least one of" or "any combination of" example elements listed therein, with "or" being understood as "or" unless otherwise indicated. Also, terms such as "based on" should be understood as "based at least in part on."

Those of ordinary skill in the art, using the disclosures provided herein, will understand that the elements of any of the claims, operations, or processes discussed herein may be adapted, rearranged, expanded, omitted, combined, or modified in various ways without deviating from the scope of the present disclosure. At times, elements may be listed in the specification or claims using a letter reference for exemplary illustrated purposes and is not meant to be limiting. Letter references, if used, do not imply a particular order of operations or a particular importance of the listed elements. For instance, letter identifiers such as (a), (b), (c), . . . , (i), (ii), (iii), . . . , etc. may be used to illustrate operations or different elements in a list. Such identifiers are provided for the ease of the reader and do not denote a particular order, importance, or priority of steps, operations, or elements. For instance, an operation illustrated by a list identifier of (a), (i), etc. may be performed before, after, or in parallel with another operation illustrated by a list identifier of (b), (ii), etc.

What is claimed is:

1. A computing system comprising:
    a control circuit configured to:
    obtain, over a network, a first communication from a first vehicle by a first channel, the first channel associated with a first communication protocol;
    generate ongoing session data associated with the first communication, the ongoing session data defining a first online session between the computing system and the first vehicle over the first channel;
    determine, by the control circuit, a network event associated with the first vehicle from the first online session associated with the first communication protocol, wherein the network event is associated with an event timestamp;
    in response to determining the network event, generate first session record data associated with the first online session, the first session record data comprising the event timestamp and identifying the first channel; and
    output, for storage in a memory, the first session record data in a session history dataset associated with the first vehicle;
    wherein the session history dataset associated with the first vehicle comprises at least second session record data for a second online session between the computing system and the first vehicle over a second channel that is different from the first channel, the second channel associated with a second communication protocol that is different from the first communication protocol.

2. The computing system of claim 1, wherein the session history dataset associated with the first vehicle is stored in a session history database comprising at least one or more second session history datasets associated with a fleet of vehicles comprising the first vehicle; and wherein the control circuit is further configured to compute aggregate data for the first vehicle based on the session history dataset and the at least one or more second session history datasets associated with the fleet of vehicles comprising the first vehicle.

3. The computing system of claim 2, wherein the control circuit is further configured to:
    obtain a request via an online status API of the session history database, the request comprising a vehicle identifier associated with the first vehicle;
    based on the vehicle identifier, access the session history dataset associated with the first vehicle;
    determine most recent session record data associated with the first vehicle irrespective of channel;
    determine an online status of the first vehicle based on an event timestamp of the most recent session record data associated with the first vehicle; and
    provide the online status of the first vehicle via the online status API.

4. The computing system of claim 3, wherein determining most recent session record data associated with the first vehicle irrespective of channel comprises:
    accessing most recent session record data associated with each of a plurality of channels for communication between the computing system and the first vehicle, the plurality of channels including the first channel and the second channel; and
    determining the most recent session record data associated with the first vehicle based on a comparison of event timestamps of the most recent session record data associated with each of the plurality of channels.

5. The computing system of claim 2, wherein the control circuit is further configured to:
    obtain a request via a vehicle history API, the request comprising one or more search criteria, the one or more search criteria comprising at least a vehicle identifier;
    based on the vehicle identifier, access the session history dataset associated with the first vehicle;
    generate a response based on the one or more search criteria, the response comprising returned session record data of the session history dataset, the returned session record data satisfying the one or more search criteria; and
    provide the response via the vehicle history API.

6. The computing system of claim 2, wherein computing the aggregate data comprises at least one of:
    determining a quantity of online vehicles of the fleet of vehicles associated with one or more analytic criteria;
    determining a quantitative ranking of online vehicles of the fleet of vehicles associated with the one or more analytic criteria;
    generating a traffic ranking of online vehicles of the fleet of vehicles based on a geographic region; or
    determining a connectivity event in a region serviced by the fleet of vehicles based on the session history dataset.

7. The computing system of claim 1, wherein the first communication protocol or the second communication protocol comprise one or more of: an HTTP protocol; an SMS protocol; or an MQTT protocol.

8. The computing system of claim 1, wherein the network event comprises a disconnect event indicating that the first vehicle has disconnected from the first online session.

9. The computing system of claim 1, wherein determining the network event comprises:
subsequent to obtaining the first communication, initiating a disconnect countdown associated with the first online session;
resetting the disconnect countdown in response to receiving a subsequent communication from the first vehicle;
determining that the disconnect countdown has expired; and
in response to determining that the disconnect countdown has expired, determining the event timestamp based on a timestamp associated with a most recent communication from the first vehicle.

10. The computing system of claim 9, wherein determining the network event comprises determining that the first vehicle has initiated a new online session with the computing system over the first channel and determining the event timestamp based on a timestamp associated with a most recent communication of the first online session.

11. The computing system of claim 1, wherein the control circuit is further configured to:
determine, based on the session history dataset, an expected operating characteristic of the first vehicle, the expected operating characteristic comprising at least one of an expected operating duration, an expected communication channel, or an expected operating time;
determine, based on the expected operating characteristic, a predicted backend session for providing a backend service to the first vehicle; and
provide the backend service to the first vehicle based on the predicted backend session.

12. The computing system of claim 1, wherein obtaining the first communication from the first vehicle comprises:
receiving the first communication from the first vehicle at a first service in communication with the first vehicle through the first communication protocol; and
providing the first communication from the first service to a vehicle visibility service configured to generate the ongoing session data based on the first communication.

13. The computing system of claim 1, wherein the control circuit is further configured to, prior to obtaining the first communication from the first vehicle, receive a confirmation message from an operator of the first vehicle, the confirmation message authorizing the control circuit to obtain the first communication from the first vehicle.

14. The computing system of claim 1, wherein the first session record data comprises an initial timestamp associated with the first communication.

15. The computing system of claim 1, wherein:
the session history dataset associated with the first vehicle comprises third session record data for a third online session between the computing system and the first vehicle over the first channel using the first communication protocol; and
one or more of the first online session, the second online session, or the third online session are associated with a respective disconnect event indicating that the first vehicle has disconnected from the one or more of the first online session, the second online session, or the third online session.

16. A computer-implemented method comprising:
obtaining, over a network, a first communication from a first vehicle by a first channel, the first channel associated with a first communication protocol;
generating ongoing session data associated with the first communication, the ongoing session data defining a first online session between a remote computing system and the first vehicle over the first channel;
determining a network event by the first vehicle from the first online session associated with the first communication protocol, wherein the network event is associated with an event timestamp;
in response to determining the network event, generating first session record data associated with the first online session, the first session record data comprising the event timestamp and identifying the first channel;
outputting, for storage in a memory, the first session record data in a session history dataset associated with the first vehicle, wherein the session history dataset associated with the first vehicle comprises at least second session record data for a second online session between the remote computing system and the first vehicle over a second channel that is different from the first channel, the second channel associated with a second communication protocol that is different from the first communication protocol; and
computing aggregate data for the first vehicle based on the session history dataset and at least one or more second session history datasets associated with a fleet of vehicles comprising the first vehicle.

17. The method of claim 16, further comprising:
obtaining a request via an online status API of a session history database, the request comprising a vehicle identifier associated with the first vehicle;
based on the vehicle identifier, accessing the session history dataset associated with the first vehicle;
determining most recent session record data associated with the first vehicle irrespective of channel;
determining an online status of the first vehicle based on an event timestamp of the most recent session record data associated with the first vehicle; and
providing the online status of the first vehicle via the online status API.

18. The method of claim 16, further comprising:
obtaining a request via a vehicle history API, the request comprising one or more search criteria, the one or more search criteria comprising at least a vehicle identifier and one or more of a channel identifier, a timeframe, or a geographic region;
based on the vehicle identifier, accessing the session history dataset associated with the first vehicle;
generating a response based on the one or more search criteria; the response comprising session record data of the session history dataset that conform to the one or more search criteria; and
providing the response via the vehicle history API.

19. The method of claim 16, further comprising:
determining, based on the session history dataset, an expected operating characteristic of the first vehicle, the expected operating characteristic comprising at least one of an expected operating duration, an expected communication channel, or an expected operating time;

determining, based on the expected operating characteristic, a predicted backend session for providing a backend service to the first vehicle; and providing the backend service to the first vehicle based on the predicted backend session.

20. One or more non-transitory computer-readable media that store instructions that are executable by a control circuit to:

obtain, over a network, a first communication from a first vehicle by a first channel, the first channel associated with a first communication protocol;

generate ongoing session data associated with the first communication, the ongoing session data defining a first online session between the computing system and the first vehicle over the first channel;

determine, by the control circuit, a network event associated with the first vehicle from the first online session associated with the first communication protocol, wherein the network event is associated with an event timestamp;

in response to determining the disconnection, generate first session record data associated with the first online session, the first session record data comprising the event timestamp and identifying the first channel; and output, for storage in a memory, the first session record data in a session history dataset associated with the first vehicle;

wherein the session history dataset associated with the first vehicle comprises at least second session record data for a second online session between the computing system and the first vehicle over a second channel that is different from the first channel, the second channel associated with a second communication protocol that is different from the first communication protocol.

* * * * *